US006268678B1

(12) United States Patent
Asao et al.

(10) Patent No.: US 6,268,678 B1
(45) Date of Patent: Jul. 31, 2001

(54) ALTERNATOR

(75) Inventors: Yoshihito Asao; Kyoko Higashino; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,203

(22) Filed: May 23, 2000

(30) Foreign Application Priority Data

Jan. 26, 2000 (JP) .................................................. 12-017417

(51) Int. Cl.⁷ .............................. H02K 3/04; H02K 3/12
(52) U.S. Cl. ........................ 310/201; 310/180; 310/195
(58) Field of Search ..................................... 310/179, 180, 310/201, 263, 184, 195

(56) References Cited

U.S. PATENT DOCUMENTS 4,833,356 * 5/1989 Bansal et al. .......................... 310/207
5,097,167 * 3/1992 Kanayama et al. ................... 310/201

FOREIGN PATENT DOCUMENTS

| 46-5816 | 12/1971 | (JP) . | |
|---|---|---|---|
| 51-54203 | 5/1976 | (JP) | H02K/3/04 |
| 62-272836 | 11/1987 | (JP) | H02K/3/04 |
| 426345 | 1/1992 | (JP) | H02K/19/22 |
| 11-164505 | 6/1999 | (JP) | H02K/3/24 |
| 11-191946 | 7/1999 | (JP) | H02K/9/06 |

* cited by examiner

Primary Examiner—Burton S. Mullins
(74) Attorney, Agent, or Firm—Sughrue, Mion, Zinn, Macpeak & Seas, PLLC

(57) ABSTRACT

An alternator has stator winding including a number of stator winding sub-portions each of which is constituted by insulated strands of wire wound onto the stator core so as to be housed in different layers relative to a slot depth direction within slots a predetermined number of slots apart, the different layers within the slots the predetermined number of slots apart being joined in series outside the slots to constitute coil ends; each of the coil ends is formed into a connection pattern comprising a pair of root portions extending outwards from the slots the predetermined number of slots apart, a pair of inclined portions bent over and extending circumferentially from the root portions and a connecting portion connecting ends of the pair of inclined portions to each other; coil end groups of the stator winding are constructed by arranging the coil ends formed into the connection pattern neatly into rows circumferentially at both axial ends of the stator core, and the coil ends in at least one of the coil end groups are arranged in rows circumferentially such that the inclined portions of adjacent coil ends are in close proximity to each other without gaps.

17 Claims, 14 Drawing Sheets

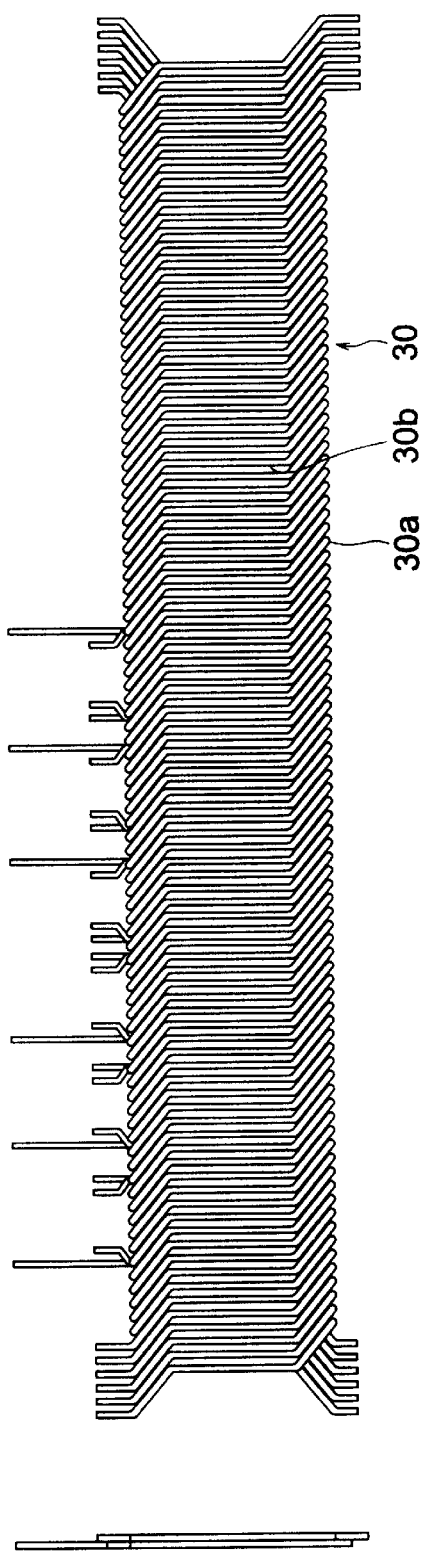

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 19 is a partial front elevation of a conventional stator mounted in an automotive alternator viewed from an inner circumferential side, and FIG. 20 is a perspective of part of the conventional stator mounted in an automotive alternator viewed from a front side.

In FIGS. 19 and 20, a stator 50 includes: a cylindrical stator core 51 formed with a number of slots 51a extending axially at a predetermined pitch in a circumferential direction; a stator winding 52 wound onto the stator core 51; and insulators 53 installed in each of the slots 51a for electrically insulating the stator winding 52 from the stator core 51. Although not shown, in this conventional example a rotor has 12 poles, and the stator 50 has thirty-six slots 51a, which is one slot per pole per phase.

The stator winding 52 is constructed by connecting in series a number of coil segments 55 composed of short lengths of insulated electrical conductor. Each of the coil segments 55 is formed in a general U shape consisting of a pair of leg portions 55a joined by a turn portion 55b.

The coil segments 55 are inserted two at time from a rear end of the stator core into sets of slots 51a three slots apart. At that time, four leg portions 55a are housed in each slot 51a so as to line up in a row in a radial direction. Each of the coil segments 55 on the inner circumferential side is inserted into a first position from the inner circumferential side of a first slot 51a and a second position from the inner circumferential side of a second slot 51a three slots away, and each of the coil segments 55 on the outer circumferential side is inserted into a third position from the inner circumferential side of the first slot 51a and a fourth position from the inner circumferential side of the second slot 51a three slots away. In other words, the coil segments 55 are housed in sets of slots 51a three slots apart so as to be in different layers.

Next, each of the coil segments 55 is bent such that free ends 55c extending outwards from a front end open outwards in a circumferential direction. Then, free ends 55c of coil segments 55 extending outwards from the front end from the first position from the inner circumferential side of the slots 51a are stacked in a radial direction with the free ends 55c of coil segments 55 extending outwards from the front end from the second position from the inner circumferential side of slots 51a three slots away, and are joined by soldering or laser welding. Two inner circumferential coils consisting of six coil segments 55 connected in series are thus obtained.

Similarly, free ends 55c of coil segments 55 extending outwards from the front end from the third position from the inner circumferential side of the slots 51a are stacked in the radial direction with the free ends 55c of coil segments 55 extending outwards from the front end from the fourth position from the inner circumferential side of slots 51a three slots away, and are joined by soldering or laser welding. Two outer circumferential coils consisting of six coil segments 55 connected in series are thus obtained.

These inner and outer circumferential coils are connected in series to form one phase of coil having 4 turns.

Furthermore, two other phases of coil are also formed in a similar manner.

The stator winding 52 is formed by connecting these three phases of coil into an alternating-current connection.

As shown in FIGS. 19 and 20, in the stator 50 constructed in this manner, the coil ends formed by joining the free ends 55c of the coil segments 55 to each other are mutually spaced and arranged in neat rows in a circumferential direction and constitute front-end coil end groups 52a. The coil ends consisting of the turn portions 55b of the coil segments 55 are mutually spaced and arranged in neat rows in a circumferential direction and constitute rear-end coil end groups 52b.

In the conventional stator 50, because the front- and rear-end coil end groups 52a and 52b are constructed by mutually spacing and circumferentially arranging coil ends which connect outside the slots different layers in slots 51a three slots apart, axial heights of the front- and rear-end coil end groups 52a and 52b have been raised and irregularities in the circumferential direction have arisen on the inner circumferential side of the front- and rear-end coil end groups 52a and 52b.

Thus, when this stator 50 is mounted in an alternator, the disadvantages described below arise, and a problem has been that improvements in reliability, increases in performance, and reductions in cost have not been possible.

Namely, there is a risk that foreign matter will infiltrate the coil end groups 52a and 52b through gaps between the coil ends, damaging the insulation on the electrical conductors and degrading insulation quality.

Furthermore, the longer the axial length of the coil end groups 52a and 52b, the greater the wind resistance against the cooling air flowing around the coil end groups 52a and 52b, reducing cooling quality, allowing the temperature of the stator winding 52 to increase excessively.

Also, the longer the axial length of the coil end groups 52a and 52b, the greater the coil resistance and coil end leakage reactance, reducing output, increasing copper loss, and also reducing efficiency.

Because there are circumferential irregularities on the inner circumferential side of the coil end groups 52a and 52b, interference noise between the coil end groups 52a and 52b and the rotor is increased, increasing wind noise.

In addition, the amount of copper constituting the material of the stator winding 52 is increased, causing cost increases.

Moreover, the greater the number of sots per pole per phase, the greater the axial length of the coil end groups, exacerbating the above disadvantages.

SUMMARY OF THE INVENTION

In order to solve the above problems, an object of the present invention is to provide an alternator applicable for automotive use enabling the realization of improved reliability, high performance, and low cost by constructing the coil end groups such that coil ends are arranged in close proximity to one another.

In order to achieve the above object, according to one aspect of the present invention, there is provided an alternator including:

a rotor for forming north-seeking (N) and south-seeking (S) poles along a rotational circumference;

a stator having a cylindrical stator core formed with a number of slots extending axially at a predetermined pitch in a circumferential direction and disposed around an outer circumference of the rotor facing the rotor and a stator winding wound onto the stator core;

a bracket supporting the rotor and the stator;

a rectifier disposed at one end of the rotor; and a cooling means operating together with rotation of the rotor for forming a passage of cooling air within the bracket for cooling the rotor and the rectifier, the stator winding comprising:

a number of stator winding sub-portions each of which is constituted by insulated strands of wire wound onto the stator core so as to be housed in different layers relative to a slot depth direction within slots a predetermined number of slots apart, the different layers within the slots the predetermined number of slots apart being joined in series outside the slots to constitute coil ends, wherein each of the coil ends is formed into a connection pattern comprising a pair of root portions extending outwards from the slots the predetermined number of slots apart, a pair of inclined portions bent over and extending circumferentially from the root portions and a connecting portion connecting ends of the pair of inclined portions to each other, wherein coil end groups of the stator winding are constructed by arranging the coil ends formed into the connection pattern neatly into rows circumferentially at both axial ends of the stator core, and wherein the coil ends in at least one of the coil end groups are arranged in rows circumferentially such that the inclined portions of adjacent coil ends are in close proximity to each other without gaps.

BRIEF DESCRIPTION OF THE DRAWINGS

FIGS. 9A and 9B are diagrams showing an outer-layer-side winding assembly constituting the stator winding used in the automotive alternator according to Embodiment 1 of the present invention;

DETAILED DESCRIPTION OF THE PREFERRED EMBODIMENTS

The preferred embodiments of the present invention will now be explained with reference to the diagrams.

EMBODIMENT 1

Figure 1:
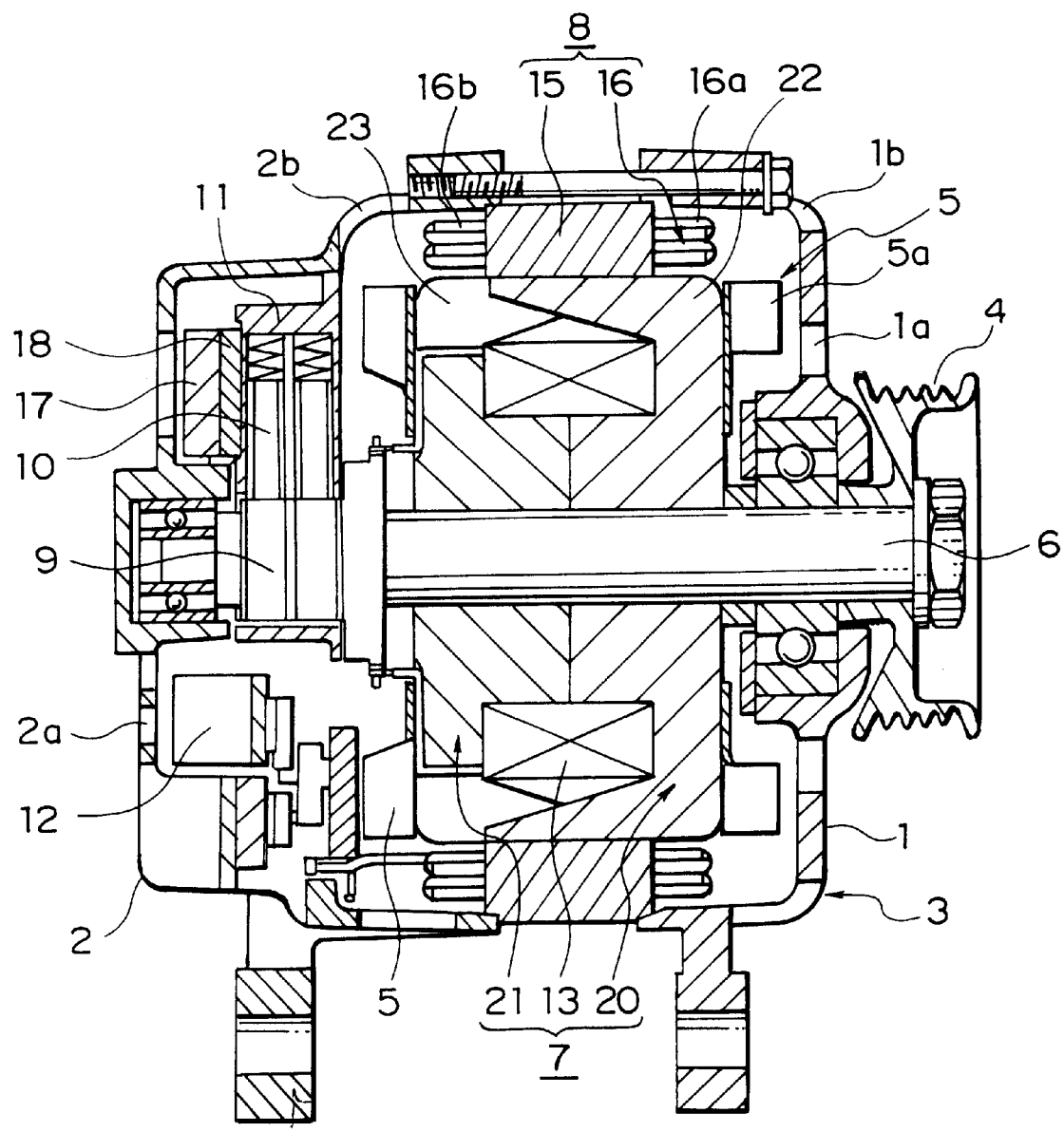
FIG. 1 is a cross section showing a construction of an automotive alternator according to Embodiment 1 of the present invention.
Figure 2:
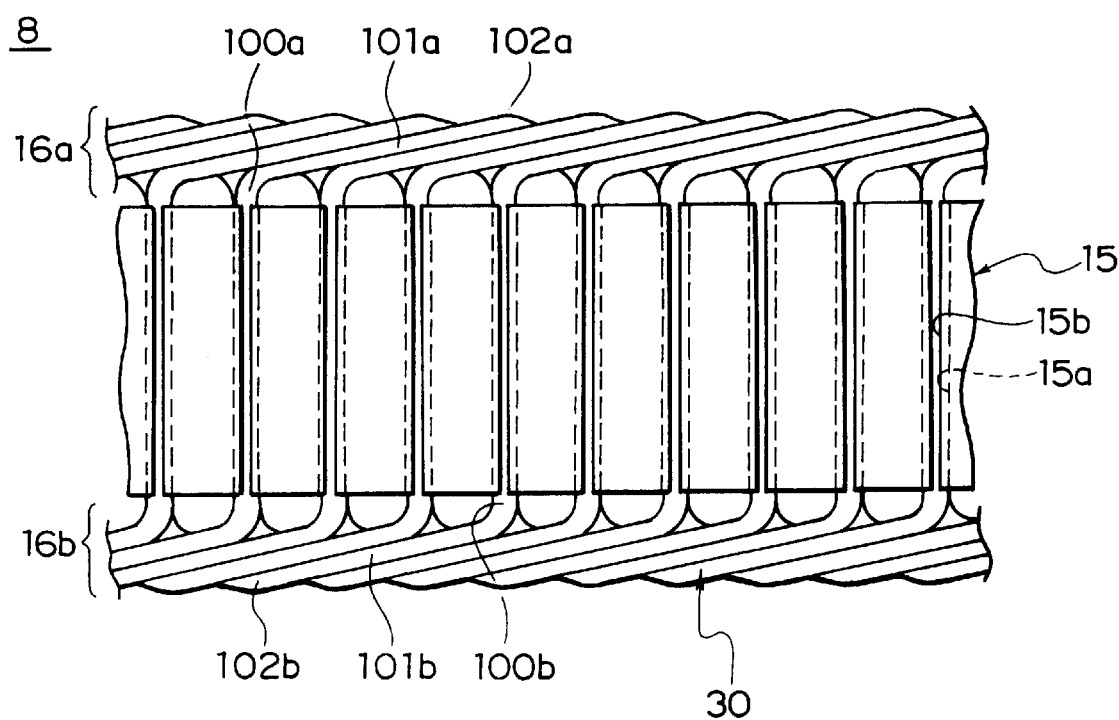
FIG. 2 is a partial front elevation of a stator for the automotive alternator according to Embodiment 1 of the present invention viewed from an inner circumferential side.
Figure 3:
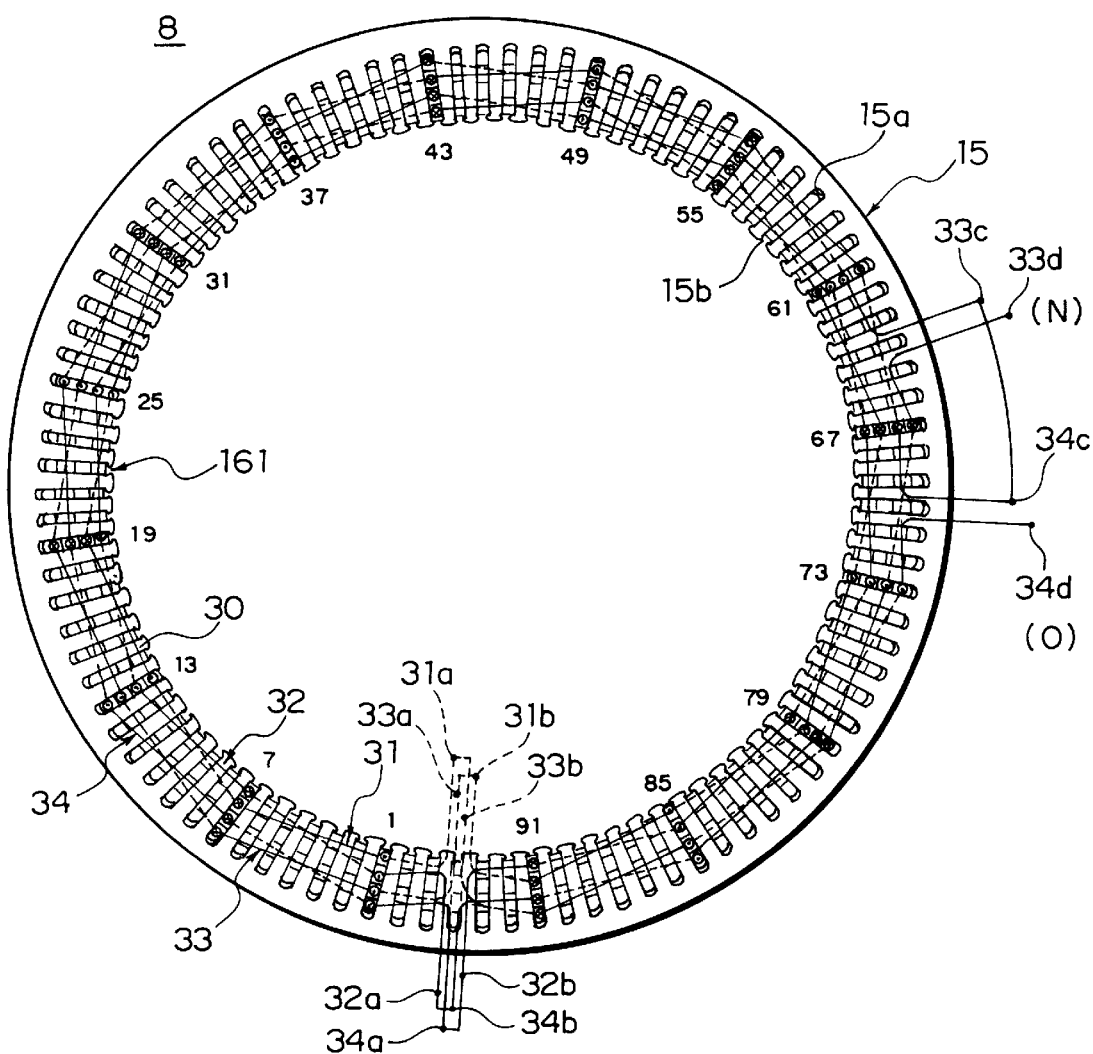
FIG. 3 is an end elevation explaining connections in one phase of a stator winding in the automotive alternator according to Embodiment 1 of the present invention.
Figure 4:
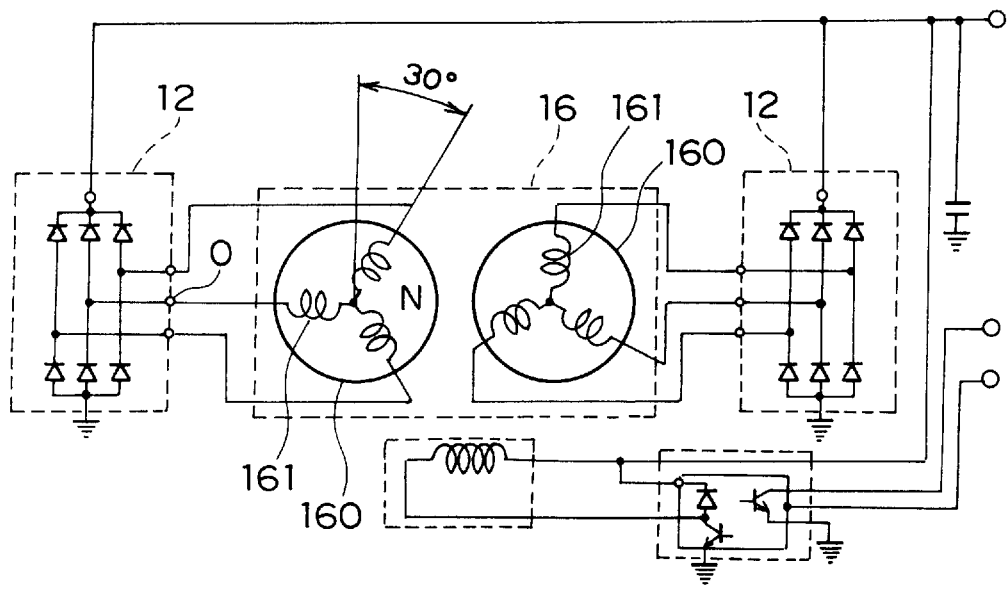
FIG. 4 is a circuit diagram for the automotive alternator according to Embodiment 1 of the present invention.
Figure 5:
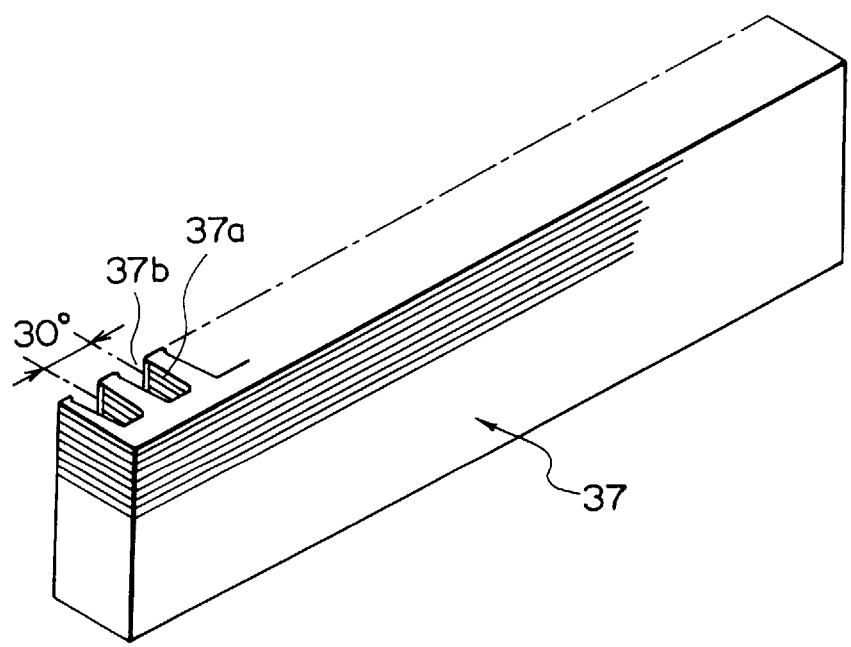
FIG. 5 is a perspective showing a laminated core constituting a stator core used in the automotive alternator according to Embodiment 1 of the present invention.
Figure 6:
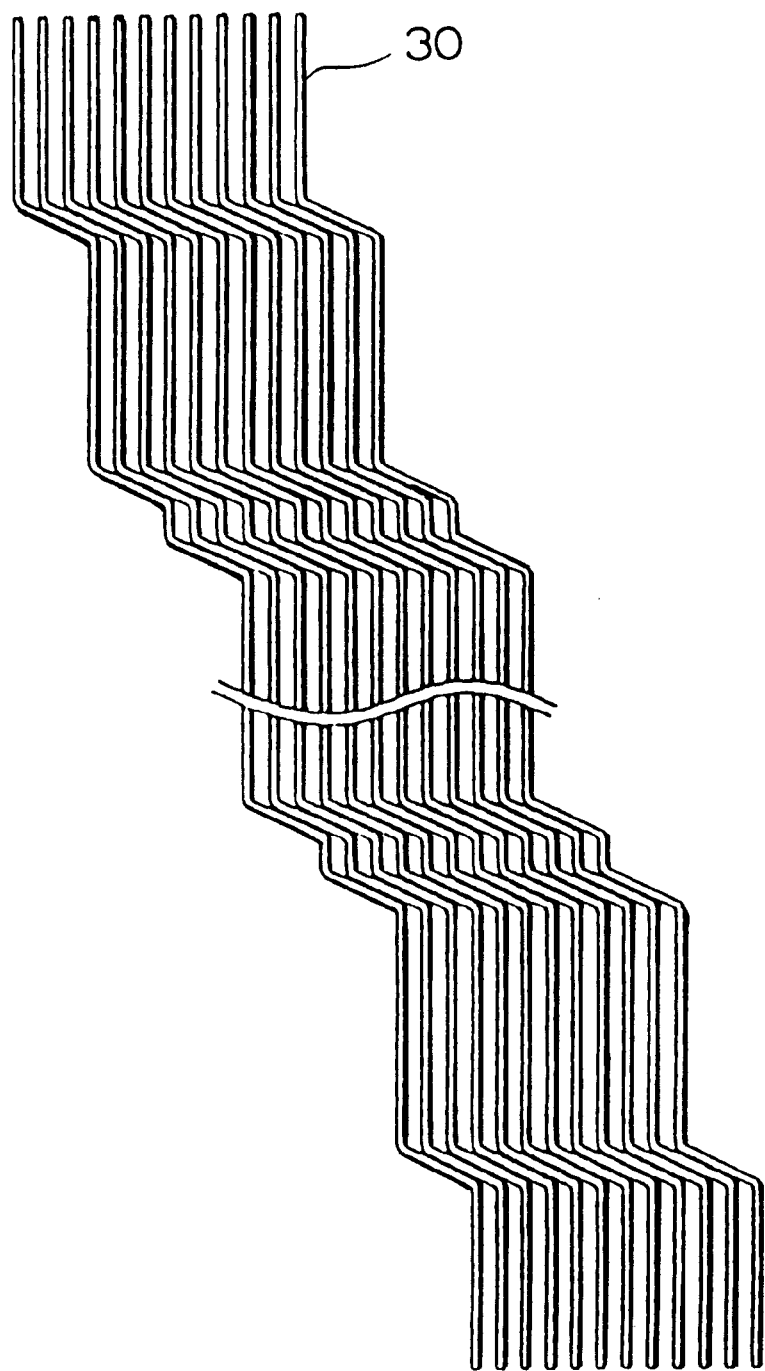
FIG. 6 is a diagram explaining the manufacturing process for winding groups constituting the stator winding used in the automotive alternator according to Embodiment 1 of the present invention.
Figure 7:
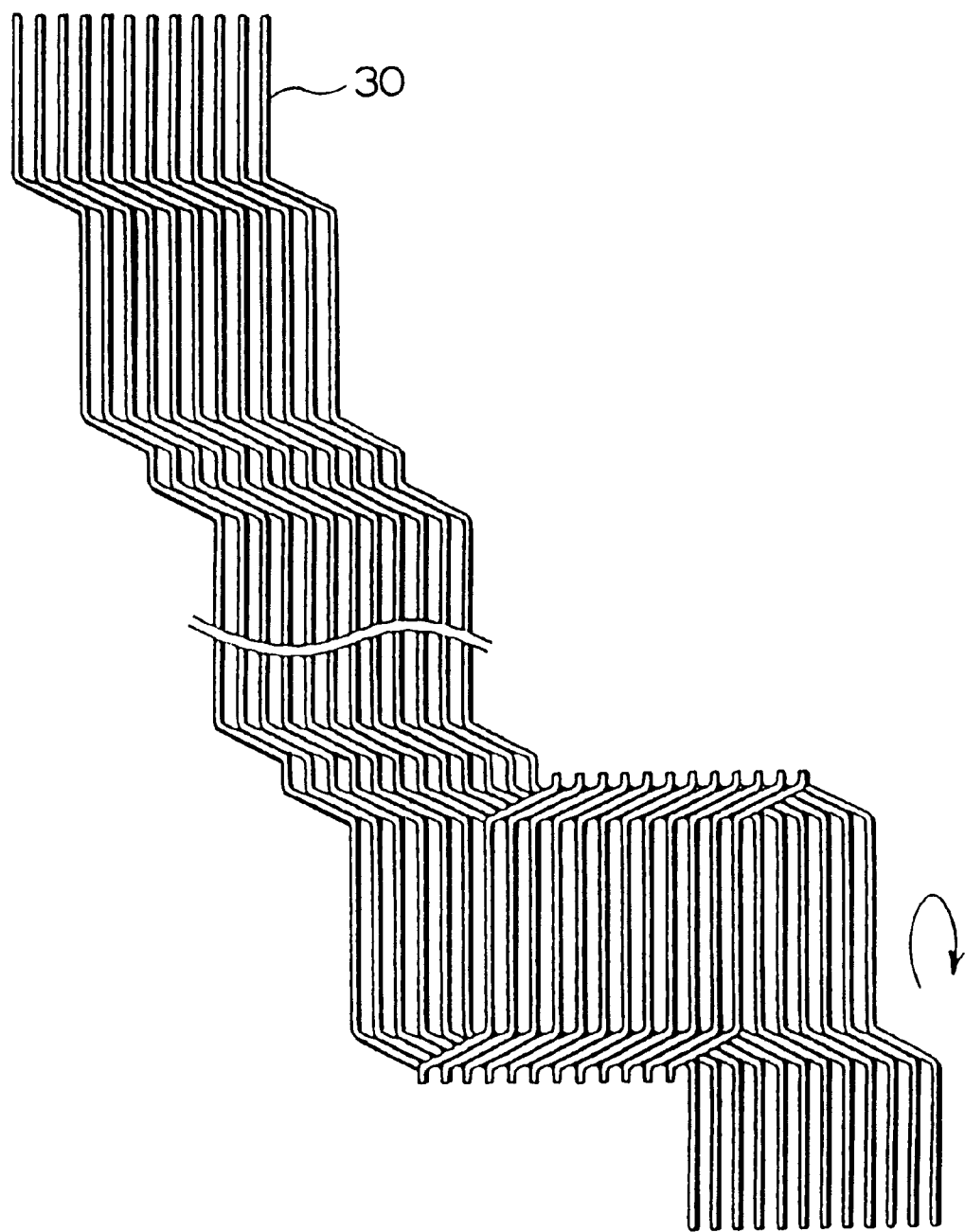
FIG. 7 is a diagram explaining the manufacturing process for winding groups constituting the stator winding used in the automotive alternator according to Embodiment 1 of the present invention.
Figures 8A, 8B:
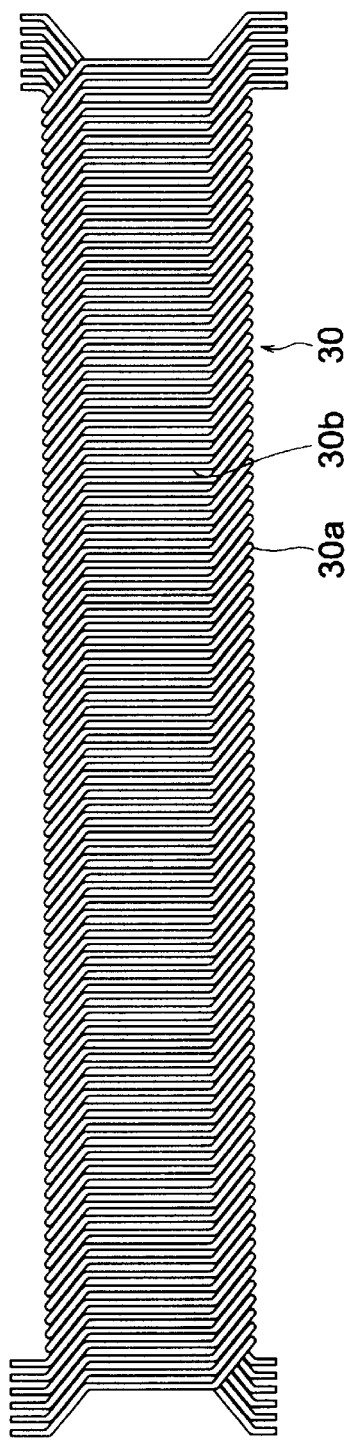
FIGS. 8A and 8B are diagrams showing an inner-layer-side winding assembly constituting the stator winding used in the automotive alternator according to Embodiment 1 of the present invention.
Figure 10:
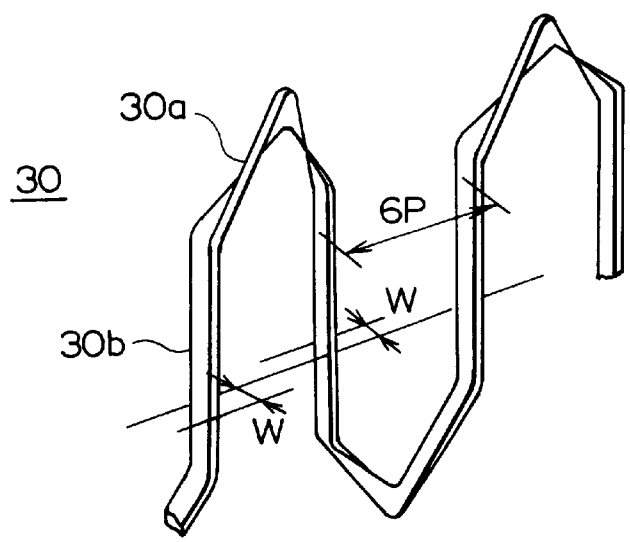
FIG. 10 is a perspective showing part of a strand of wire constituting the stator winding used in the automotive alternator according to Embodiment 1 of the present invention.
Figure 11:
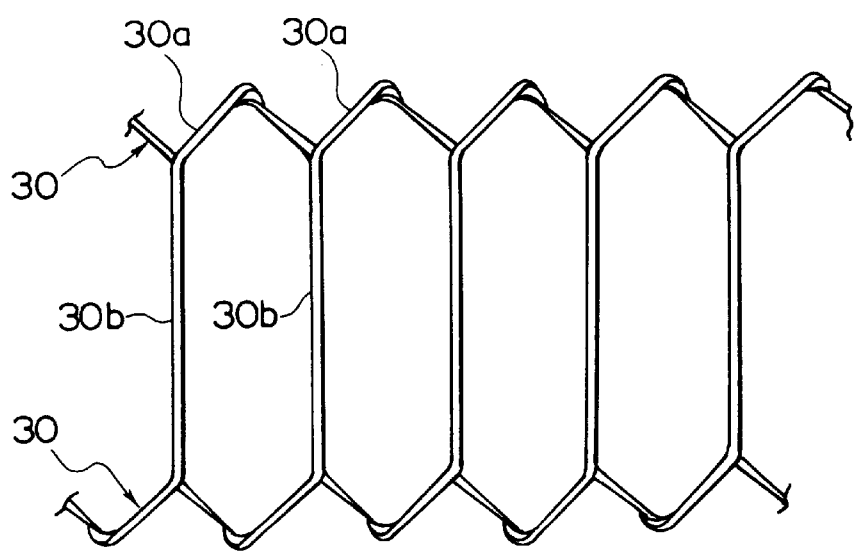
FIG. 11 is a diagram explaining the arrangement of strands of wire constituting the stator winding used in the automotive alternator according to Embodiment 1 of the present invention.

FIG. 1 is a cross section showing a construction of an automotive alternator according to Embodiment 1 of the present invention, FIG. 2 is a partial front elevation of part of a stator for this automotive alternator, FIG. 3 is an end elevation explaining connections in one phase of a stator winding in this automotive alternator, FIG. 4 is a circuit diagram for this automotive alternator, FIG. 5 is a perspective showing a laminated core constituting a stator core in this automotive alternator, and FIGS. 6 and 7 are diagrams explaining the manufacturing process for winding groups constituting the stator winding used in this automotive alternator. FIGS. 8A and 8B are diagrams showing an inner-layer-side winding assembly constituting the stator winding used in this automotive alternator, FIG. 8A being a side elevation and FIG. 8B being a front elevation. FIGS. 9A and 9B are diagrams showing an outer-layer-side winding assembly constituting the stator winding used in this automotive alternator, FIG. 9A being a side elevation and FIG. 9B being a front elevation. FIG. 10 is a perspective showing part of a strand of wire constituting the stator winding used in this automotive alternator, and FIG. 11 is a diagram explaining the arrangement of strands of wire constituting the stator winding used in this automotive alternator.

In FIGS. 1 and 2, the automotive alternator is constructed by rotatably mounting a Lundell-type rotor 7 inside a case constructed from an aluminum front bracket 1 and an aluminum rear bracket 2 by means of a shaft 6, and fastening a stator 8 to an inner wall of the case so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown). Slip rings 9 for supplying electric current to the rotor 7 are fastened to a second end of the shaft 6, and a pair of brushes 10 are housed in a brush holder 11 disposed inside the case such that the pair of brushes slide in contact with the slip rings 9. A regulator 18 for regulating the output voltage of the stator 8 is fastened by adhesive to a heat sink 17 fitted onto the brush holder 11. Rectifiers 12 which are electrically connected to the stator 8 and rectify alternating current generated in the stator 8 into direct current are mounted inside the case 3.

The rotor 7 is a claw-pole-type rotor, and is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated by the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh, constituting a rotor core. In addition, fans 5 including a number of blades 5*a* are fastened to first and second axial ends of the rotor 7 and function as a cooling means.

The stator 8 includes: a cylindrical stator core 15 formed with a number of slots 15*a* extending axially at a predetermined pitch in a circumferential direction; a stator winding 16 wound onto the stator core 15; and insulators (not shown) installed in each of the slots 15*a* for electrically insulating the stator winding 16 from the stator core 15.

The stator winding 16 includes a number of winding sub-portions which are wave-wound into every sixth slot of the slots 15*a* such that wires 30 alternately occupy an inner layer and an outer layer in a slot depth direction. The coil ends of the wires 30 outside the slots connecting inner layers in first slots 15*a* to outer layers in second slots 15*a* six slots away are formed into a connection pattern consisting of pairs of root portions 100*a* (100*b*) extending outwards from end surfaces of the stator core 15 from each of the slots 15*a*, pairs of inclined portions 101*a* (10*b*) bent in directions approaching each other so as to extend in a circumferential direction, and connecting portions 102*a* (102*b*) connecting end portions of pairs of inclined portions 101*a* (101*b*). At first and second axial ends of the stator core 15, coil ends formed into these connections patterns are repeated circumferentially to constitute coil end groups 16*a* and 16*b*. In addition, adjacent inclined portions 101*a* (101*b*) of the coil ends are in close proximity to each other.

In this case, the stator core 15 is formed with ninety-six slots 15*a* at even pitch so as to house two sets of three-phase alternating-current winding portions such that the number of slots housing each phase of the winding portions corresponds to the number of magnetic poles (sixteen) in the rotor 7. Furthermore, the axial length of the stator 8 is formed shorter than the axial length of the rotor core. The coil end groups 16*a* and 16*b* are formed so as to have equal axial length. Continuous wire composed of insulated copper wire material having a rectangular cross section, for example, is used for the wires 30.

Air intake openings 1*a* and 2*a* are disposed in axial end surfaces of the front bracket 1 and the rear bracket 2, and air discharge openings 1*b* and 2*b* served as openings are disposed in two outer circumferential shoulder portions of the front bracket 1 and the rear bracket 2, opposite the radial outside of the front-end and rear-end coil ends 16*a* and 16*b* of the stator winding 16.

Next, the winding construction of one phase of a stator winding group 161 will be explained in detail with reference to FIG. 3. FIG. 3 is a rear-end elevation explaining connections in one phase of the stator winding 16, rear-end connections in the figure being indicated by solid lines and front-end connections being indicated by dotted lines.

One phase of the stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an inner circumferential side and a second position from the inner circumferential side inside the slots 15*a*. The second winding sub-portion 32 is formed by wave winding a strand of wire 30 into every sixth slot from slot numbers 1 to 91 so as to alternately occupy the second position and the first position inside the slots 15*a*. The third winding sub-portion 33 is formed by wave winding a strand of wire 30 into every sixth slot from slot numbers 1 to 91 so as to alternately occupy a third position from the inner circumferential side and a fourth position from the inner circumferential side inside the slots 15*a*. The fourth winding sub-portion 32 is formed by wave winding a strand of wire 30 into every sixth slot from slot numbers 1 to 91 so as to alternately occupy the fourth position and the third position inside the slots 15*a*. The strands of wire 30 are arranged to line up in a row of four strands within each slot 15*a* with the longitudinal direction of their rectangular cross sections aligned in a radial direction.

At the front end of the stator core 15, a first end portion 31*a* of the first winding sub-portion 31 extending outwards from slot number 1 and a second end portion 33*b* of the third winding sub-portion 33 extending outwards from slot number 91 are joined, and in addition, a first end portion 33*a* of the third winding sub-portion 33 extending outwards from slot number 1 and a second end portion 31*b* of the first winding sub-portion 31 extending outwards from slot number 91 are joined to form two turns of winding.

At the rear end of the stator core 15, a first end portion 32*a* of the second winding sub-portion 32 extending outwards from slot number 1 and a second end portion 34*b* of the fourth winding sub-portion 34 extending outwards from slot number 91 are joined, and in addition, a first end portion 34*a* of the fourth winding sub-portion 34 extending outwards from slot number 1 and a second end portion 32*b* of the second winding sub-portion 32 extending outwards from slot number 91 are joined to form two turns of winding.

In addition, a portion of the wire 30 of the third winding sub-portion 33 extending outwards at the rear end of the stator core 15 from slot numbers 61 and 67 is cut, and a portion of the wire 30 of the fourth winding sub-portion 34 extending outwards at the rear end of the stator core 15 from slot numbers 67 and 73 is also cut. A first cut end 33*c* of the third winding sub-portion 33 and a first cut end 34*c* of the fourth winding sub-portion 34 are joined to form one phase of the stator winding group 161 having four turns constructed by connecting the first to fourth winding sub-portions 31 to 34 in series.

Moreover, the joint portion between the first cut end 33*c* of the third winding sub-portion 33 and the first cut end 34*c* of the fourth winding sub-portion 34 becomes a bridging connection connecting portion, a second cut end 33d of the third winding sub-portion 33 and a second cut end 34d of the fourth winding sub-portion 34 become a neutral-point lead wire (N) and a lead wire (O), respectively.

Six phases of the stator winding group 161 are similarly formed by offsetting the slots 15a into which the strands of wire 30 are wound one slot at a time. Then, three phases of the stator winding group 161 are formed into a star connection by connecting their respective neutral-point lead wires (N) to form a three-phase alternating-current winding 160. The remaining three phases of the stator winding group 161 are similarly connected to form a three-phase alternating-current winding 160. A stator winding 16 composed of two sets of three-phase alternating-current windings 160 is thus obtained. As shown in FIG. 4, each of the three-phase alternating-current windings 160 is connected to its own rectifier 12, and the rectifiers 12 are connected in parallel so that the direct-current output from each is combined.

Next, the method of manufacturing the stator 8 will be explained with reference to FIGS. 5 to 11.

First, a parallelepiped laminated core 37 is prepared as shown in FIG. 5 by laminating a predetermined number of sheets of SPCC material, which is a magnetic material, formed with ninety-six trapezoidal slots 37a at a predetermined pitch (an electrical angle of 30 degrees) and laser welding an outer portion thereof.

As shown in FIG. 6, twelve long strands of wire 30 are simultaneously bent in the same plane to form them into a lightning-bolt shape. Then, a winding assembly 35A, shown in FIGS. 8A and 8B, is prepared by progressively folding the strands of wire at right angles, as indicated by the arrow in FIG. 7, using a jig. In addition, a winding assembly 35B including bridging connection portions, neutral-point lead wires, and lead wires extending outwards from a side portion, as shown in FIGS. 9A and 9B, is prepared in a similar manner.

Moreover, as shown in FIG. 10, each strand of wire 30 is formed by bending it into a planar pattern in which straight portions 30b connected by turn portions 30a are lined up at a slot pitch of six (6P). Adjacent straight portions 30b are offset by a width dimension (W) of the strands of wire 30 by means of the turn portions 30a. The winding assemblies 35A and 35B are constructed by arranging six wire pairs so as to be offset by a pitch of one slot, each wire pair consisting of two strands of wire 30 formed in the above pattern which are offset by a pitch of six slots and arranged such that straight portions 30b overlap as shown in FIG. 11. Six end portions of the strands of wire 30 each extend outwards from first and second sides at first and second ends of the winding assemblies 35A and 35B. Furthermore, the turn portions 30a are arranged such that adjacent inclined portions are in close proximity to each other and line up in rows in first and second side portions of the winding assemblies 35A and 35B.

Although not shown, insulators are mounted in the slots 37a of the laminated core 37, and the straight portions of the two winding assemblies 35A and 35B are inserted so as to stack up within each of the slots. Next, the laminated core 37 is rolled up and its ends abutted and welded to each other to obtain the cylindrical stator core 15. By rolling up the laminated core 37, the slots 37a (corresponding to the slots 15a in the stator core) take on a generally rectangular cross-sectional shape, and opening portions 37b of the slots 37a (corresponding to opening portions 15b of the slots 15a) become smaller than the dimensions of the straight portions 30b in the slot-width direction.

Then, based on the connection methods shown in FIG. 3, the end portions of each of the strands of wire 30, the bridging connections portions, etc., are connected, and then the coil end groups 16a and 16b are impregnated with varnish to obtain the stator 8.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized to N polarities (north-seeking poles) by this magnetic flux, and the claw-shaped magnetic poles 23 of the first pole core 21 are magnetized to S polarities (south-seeking poles) thereby. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through the rectifiers 12 and is rectified to direct current, its output is regulated by the regulator 18, and the battery is recharged.

At the rear end, external air is sucked in from the air intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the stator winding 16 before being discharged to the outside through the air discharge openings 2b. At the same time, at the front end, external air is sucked in axially from the air intake openings 1a by rotation of the fans 5, and is then deflected centrifugally by the fans 5, cooling the front-end coil end group 16a of the stator winding 16 before being discharged to the outside through the air discharge openings 1b.

Because, according to Embodiment 1, the front- and rear-end coil end groups 16a and 16b are constructed by circumferentially arranging the coil ends outside the slots connecting different layers in slots 15a six slots apart such that adjacent inclined portions 101a and 101b are in close proximity to each other, the axial length of the coil end groups 16a and 16b can be reduced and irregularities in the circumferential direction arising on the inner circumferential side of the coil end groups 16a and 16b can be reduced significantly compared to the conventional coil end groups 52a and 52b.

When this stator 8 is mounted in an alternator, foreign matter is less likely to enter the coil end groups 16a and 16b through gaps between the coil ends, and damage to the insulation on the strands of wire 30 is suppressed. Thus, insulation quality is improved, enabling reliability to be improved.

Because the axial length of the coil end groups 16a and 16b is reduced, wind resistance against the cooling ventilation flowing around the coil end groups 16a and 16b is reduced, raising cooling quality, enabling temperature increases in the stator winding 16 to be suppressed.

Because the axial length of the coil end groups 16a and 16b is reduced, coil resistance and coil end leakage reactance are reduced, enabling output to be improved, and copper loss is reduced, enabling efficiency to be increased.

Because circumferential irregularities occurring on the inner circumferential side of the coil end groups 16a and 16b are reduced, interference noise between the coil end groups 16a and 16b and the rotor 7 is reduced, decreasing wind noise.

In addition, the amount of copper, which is the material the stator winding 16 is made of, is reduced, enabling costs to be lowered.

Because the fans 5 are used as the cooling means, the stator 8 can be cooled inexpensively and reliably.

Because the fans 5 are fastened to end surfaces of the pole cores 20 and 21, wind channels for allowing the cooling air to ventilate the coil end groups 16a and 16b from the radial inside are formed, enabling the coil end groups 16a and 16b to be effectively cooled.

Because the coil end groups 16a and 16b are disposed next to the fans 5 on a downstream side of the direction of flow of the cooling air, the cooling air is efficiently supplied to the coil end groups 16a and 16b, enabling temperature increases in the stator winding 16 to be suppressed.

Because the air discharge openings 1b and 2b are disposed in portions of the brackets 1 and 2 which are radially outside the coil end groups 16a and 16b, the cooling air warmed during the cooling of the coil end groups 16a and 16b is swiftly discharged to the exterior through the air discharge openings 1b and 2b. Thus, deterioration of the cooling of the stator winding 16 due to warmed cooling air remaining inside the brackets 1 and 2 is suppressed.

Because the coil end groups 16a and 16b are formed so as to have equal axial length, wind resistance in both ends of the stator core 15 is generally equal and heat from the stator winding 16 is radiated from the coil end groups 16a and 16b in a balanced manner, enabling the cooling characteristics of the stator 8 to be improved.

Because the axial length of the stator 8 is formed shorter than the axial length of the rotor core, wind resistance is reduced, improving cooling characteristics and enabling the alternator to be made more compact.

Because the coil end groups 16a and 16b are formed by repeating turn portions 30a of strands of wire 30 in a circumferential direction, distances between inner circumferential surfaces of the coil end groups 16a and 16b and outer diameters of the fans are generally uniform relative to the circumferential direction, and noise generated by interference between the coil end groups 16a and 16b and the blades 5a is made more uniform, reducing wind noise.

Because the rotor core is constituted by the pole cores 20 and 21, shoulder portions of the claw-shaped magnetic poles 22 and 23 function as a wind conveying means when the rotor 7 is rotating, enabling cooling performance to be improved.

Because the coil end groups 16a and 16b are impregnated with varnish, minute gaps between adjacent coil ends are stopped with varnish, enabling the penetration of foreign matter inside the coil end groups 16a and 16b to be further prevented, and the inner circumferential surfaces of the coil end groups 16a and 16b become smooth, enabling wind noise to be further reduced. In addition, because the coil ends constituting the coil end groups 16a and 16b are fastened to each other by the varnish, damage to the insulation as a result of vibration of the coil ends is eliminated, improving the insulation characteristics, and the rigidity of the coil end groups 16a and 16b is increased, enabling magnetic noise to be reduced.

Because the strands of wire 30 are formed into a rectangular cross section, spaces between the coil ends can be easily filled, enhancing the above effects. In addition, the space factor of the strands of wire 30 inside the slots 15a is increased, enabling improved transfer of heat from the strands of wire 30 to the stator core 15. Furthermore, the surface area radiating heat from the turn portions 30a constituting the coil ends is increased, efficiently radiating heat generated by the stator winding 16. Here in Embodiment 1, the strands of wire 30 are formed into a rectangular cross section, but the cross-sectional shape of the strands of wire 30 is not limited to a rectangular cross section and may be any generally flattened shape such as an elongated elliptical shape, etc.

The stator winding 16 includes two sets of three-phase alternating-current windings 160, each of the three-phase alternating-current windings 160 being constructed by joining three phases of stator winding groups 161 into an alternating-current connection. The stator winding groups 161 are each constructed by connecting the first to fourth winding sub-portions 31 to 34 in series, each winding sub-portion being composed of a single strand of wire 30. The first winding sub-portion 31 is constructed by wave winding a single strand of wire 30 so as to alternately occupy the first and second positions of every sixth slot 15a. In other words, the first winding sub-portion 31 is constructed by wave winding a single strand of wire 30 for one turn so as to alternately occupy the inner layer and the outer layer in a slot depth direction. Similarly, the second, third, and fourth winding sub-portions 32, 33, and 34 are also constructed by wave winding single strands of wire 30 for one turn each so as to alternately occupy inner and outer layers in a slot depth direction.

Thus, the turn portions 30a of the strands of wire 30 constituting the first and second winding sub-portions 31 and 32 can be formed into the same general shape, enabling the turn portions 30a to be arranged so as to be stacked in rows circumferentially. Similarly, the turn portions 30a of the strands of wire 30 constituting the third and fourth winding sub-portions 33 and 34 can be formed into the same general shape, enabling those turn portions 30a to be arranged so as to be stacked in rows circumferentially on the outer circumferential side of the first and second winding sub-portions 31 and 32.

Thus, by adopting this winding construction, coil end groups 16a and 16b in which the inclined portions 101a and 101b of adjacent coil ends are in close proximity with each other can be easily prepared. In addition, the coil end groups 16a and 16b can be prepared so as to have the same shape as each other so that heat from the stator winding 16 is radiated from the coil end groups 16a and 16b in a balanced manner.

Because the first to fourth winding sub-portions 31 to 34 are each constituted by a single strand of wire 30, the coil ends are prepared from the turn portions 30a of the strands of wire 30. Thus, there are no joining portions between free ends 55c of segment coils 55 in the coil ends and the heights of the coil end groups 16a and 16b can be reduced, enabling wind resistance, coil end leakage inductance, copper loss, etc., to be reduced.

The winding assembly 35A is constituted by a pair of winding groups consisting of a winding group in which six first winding sub-portions 31 are arranged in rows at a pitch of one slot and a winding group in which six second winding sub-portions 32, which are constructed by offsetting by an electrical angle of 180 degrees to the first winding sub-portions 31 and winding in an inverted manner, are arranged in rows at a pitch of one slot and the winding group 35B is constituted by a pair of winding groups consisting of a winding group in which six third winding sub-portions 33 are arranged in rows at a pitch of one slot and a winding group in which six fourth winding sub-portions 34, which are constructed by offsetting by an electrical angle of 180 degrees to the third winding sub-portions 33 and winding in an inverted manner, are arranged in rows at a pitch of one slot. Because these winding assemblies 35A and 35B are used, joining portions are significantly reduced compared to when coil segments 55 are used, raising the productivity and reliability of the stator winding.

Four strands of wire 30 are arranged so as to line up in a row radially within each slot 15a, and the turn portions 30a are arranged to line up in two rows circumferentially. Thus, the turn portions 30a constituting the coil end groups 16a and 16b are each divided into two rows radially, enabling axial heights of the coil end groups 16a and 16b to be reduced. As a result, wind resistance in the coil end groups 16a and 16b is reduced, enabling wind noise resulting from the rotation of the rotor 7 to be reduced, reducing coil end leakage reactance and improving output and efficiency.

The rotor 7 has sixteen magnetic poles, and ninety-six (96) slots 15a are formed at even pitch in the stator core 15. Because the strands of wire 30 are wave wound into every sixth slot 15a, the pitch of the slots into which the strands of wire 30 are wound corresponds to the pitch between the north-seeking and south-seeking poles of the rotor 7, making the stator winding 16 a full-node winding. Thus, maximum torque can be obtained, enabling the achievement of increased output.

Because the open dimensions of the opening portions 15b of the slots 15a are constructed so as to be smaller than the dimensions of the strands of wire 30 in the width direction of the slots 15a, the strands of wire 30 are prevented from popping out of the slots 15a towards the radial inside and noise at the opening portions 15b due to interference with the rotor 7 can be reduced.

As shown in FIG. 4, two sets of three-phase alternating-current winding 160 are constructed by forming into two star connections three stator winding groups 161 each constructed by connecting the first to fourth winding sub-portions 31 to 34 in series, and each of these two sets of three-phase alternating-current windings 160 is connected to its own rectifier 12, and in addition, the outputs from the two rectifiers 12 are connected in parallel. Thus, the direct current outputs of the three-phase alternating-current windings 160 which have four turns each can be combined and extracted, enabling elimination of power generation deficits in low revolution regions.

By adopting this winding construction, increases in the number of turns in the stator winding 16 can be easily adapted for by lining up the straight portions 30b of the winding assemblies 35 (35A and 35B) which are composed of continuous strands of wire and installing them into the stator core so that they stack up on top of each other.

The stator 8 according to Embodiment 1 can be prepared by inserting the winding assemblies 35 which are composed of continuous strands of wire into the slots 37a in the parallelepiped laminated core 37 through the opening portions 37b and then rolling the laminated core 37 into an annular shape. Thus, because the open dimensions of the opening portions 37b of the slots 37a can be made larger than the dimensions of the strands of wire 30 in the width direction of the slots, the operation of inserting the winding assemblies 35A and 35B is improved. Furthermore, because the open dimensions of the opening portions 37b of the laminated core 37 can be made smaller than the dimensions of the strands of wire 30 in the width direction of the slots when the laminated core 37 is rolled up, the space factor is increased, enabling output to be improved. In addition, even if the number of slots is increased, the productivity of the stator will not deteriorate.

The number of slots housing the stator winding 16 is two per pole per phase, and there are two three-phase alternating-current windings 160 each corresponding to the number of slots per pole per phase. Thus, the magnetomotive wave form can be made to approximate a sinusoidal wave, reducing higher harmonic wave components and ensuring stable output. Because the number of slots 15a is increased, teeth in the stator core 15 are slender, reducing magnetic leakage through teeth straddling the facing claw-shaped magnetic poles 22 and 23, enabling ripples in output to be suppressed. Furthermore, because a greater number of slots 15a means a correspondingly greater number of turn portions 30a, the heat-radiating characteristics of the coil ends are improved.

Because the slots 15a and the opening portions 15b are arranged to be evenly spaced at an electrical angle of 30 degrees, magnetic ripples which result in excitation forces which cause magnetic noise can be reduced.

Moreover, in Embodiment 1, fans 5 were disposed on both axial ends of the rotor 7, but the fans 5 do not have to be disposed on both ends of the rotor 7, and they may be disposed in consideration of the positions of the stator winding or the rectifiers which are large heat-generating bodies. For example, the coil ends of the stator winding which are large heat generating bodies can be disposed on the discharge side of a fan with a large cooling speed, and a fan disposed on an end portion of the rotor on the side where the rectifiers are disposed. Furthermore, when mounted to an automotive engine, because the pulley is normally connected to a crankshaft by means of a belt, the fan may be disposed on the side away from the pulley so that the cooling exhaust from the fan does not affect the belt.

EMBODIMENT 2

In Embodiment 1 above, the air discharge openings 1b and 2b are disposed radially outside the coil end groups 16a and 16b, but in Embodiment 2, the air discharge openings 1b and 2b are not only disposed radially outside the coil end groups 16a and 16b, but also axially outside the root portions 100a and 100b of the coil ends.

In this case, foreign matter blown inside the brackets 1 and 2 from outside through the air discharge openings 1b and 2b is less likely to penetrate inside the coil end groups 16a and 16b through gaps between adjacent root portions 100a and 100b of the coil ends, suppressing damage to the insulation due to the infiltration of foreign matter and enabling reliability to be further improved.

EMBODIMENT 3

In Embodiment 3, the fan 5 fastened to the rear-end surface of the rotor 7 has a larger number of blades than the fan 5 fastened to the front-end surface of the rotor 7. Moreover, the rest of the construction is the same as in Embodiment 1.

In Embodiment 3, because the number of blades of the rear-end fan 5 is greater than the number of blades of the front-end fan 5, the capacity of the rear-end fan 5 is increased. Thus, the volume of air in the rear end of the rotor 7 where heat-generating parts such as the rectifiers 12, the regulator 18, etc., are disposed is increased, suppressing temperature increases in these heat-generating parts.

EMBODIMENT 4

Figure 12:
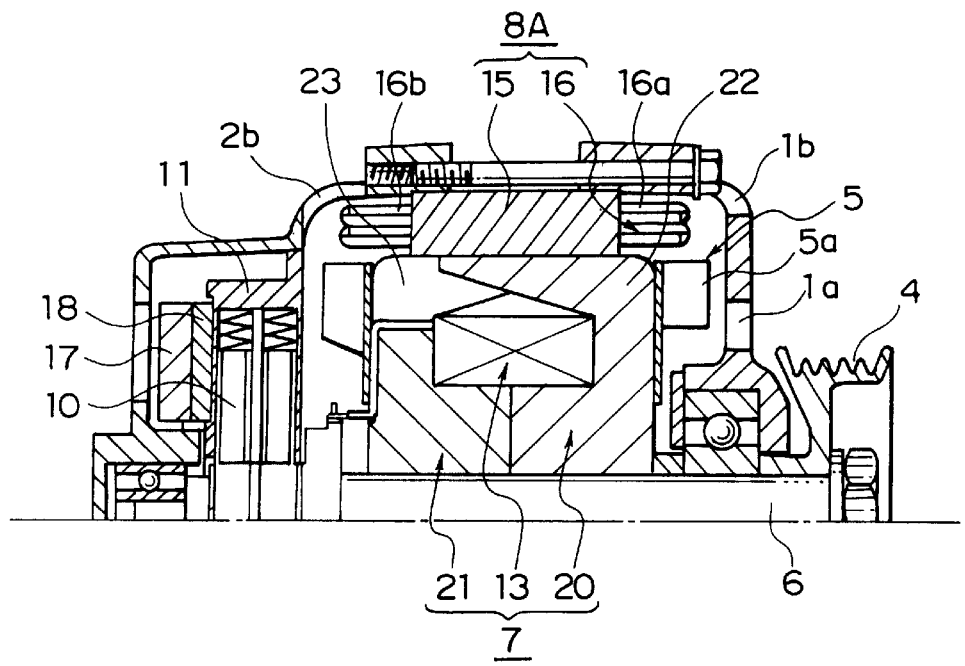
FIG. 12 is a partial cross section showing a construction of an automotive alternator according to Embodiment 4 of the present invention.

As shown in FIG. 12, in Embodiment 4, axial lengths of the coil end groups 16a and 16b are approximately equal, and the coil end groups 16a and 16b overlap the fans 5 in the axial direction. Moreover, the rest of the construction is the same as in Embodiment 1.

In a stator 8A according to Embodiment 4, because the fans 5 and the coil end groups 16a and 16b overlap axially, cooling air is supplied directly to the coil end groups 16a and 16b by means of the fans 5, heat from the stator winding 16 is effectively dissipated by the coil end groups 16a and 16b.

EMBODIMENT 5

Figure 13:
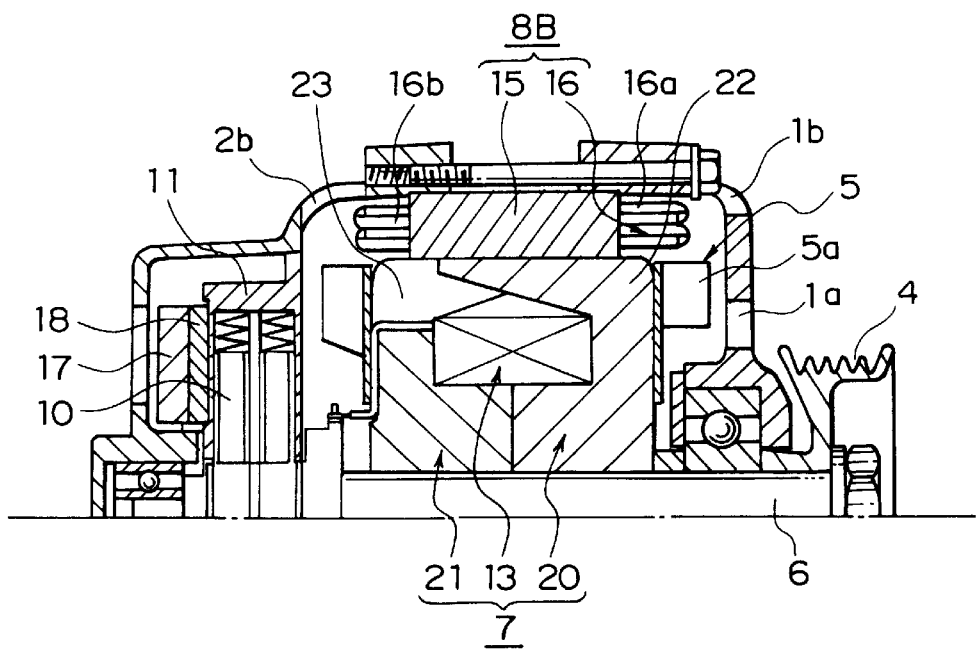
FIG. 13 is a partial cross section showing a construction of an automotive alternator according to Embodiment 5 of the present invention.

As shown in FIG. 13, in Embodiment 5, the axial length of the coil end group 16a is formed so as to be longer than the axial length of the coil end group 16b. Moreover, the rest of the construction is the same as in Embodiment 1.

In a stator 8B according to Embodiment 4, wind resistance is lower in the rear end than in the front end, increasing the volume of air in the rear end of the rotor 7 where heat-generating parts such as the rectifiers 12, the regulator 18, etc., are disposed and suppressing temperature increases in these heat-generating parts.

EMBODIMENT 6

Figure 14:
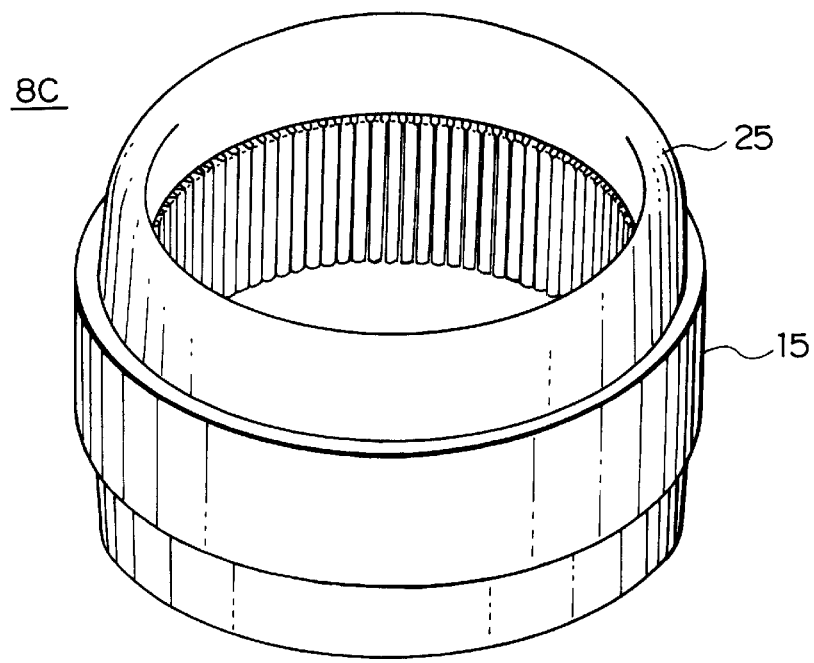
FIG. 14 is a perspective showing a stator for an automotive alternator according to Embodiment 6 of the present invention.

As shown in FIG. 14, in Embodiment 6, electrically-insulative resin 25 such as epoxy resin is disposed so as to completely cover the coil end groups 16a and 16b. Moreover, the rest of the construction is the same as in Embodiment 1 above.

In a stator 8C according to Embodiment 6, because the electrically-insulative resin 25 is disposed so as to completely cover the coil end groups 16a and 16b, the coil ends are fastened to each other, improving insulation characteristics by eliminating damage to the insulation due to vibration of the coil ends, and enabling the reduction of magnetic noise by increasing the rigidity of the coil end groups 16a and 16b.

Because the inclined portions 101a and 101b of the coil ends are in close proximity to each other, the inner circumferential surface of the electrically-insulative resin 25 is smooth, suppressing increases in noise due to interference with the rotor 7 as a result of the provision of the electrically-insulative resin 25.

Moreover, in Embodiment 6 above, the coil end groups 16a and 16b are completely covered by the electrically-insulative resin 25, but the electrically-insulative resin 25 may be disposed so as to cover at least one surface selected between the inner circumferential surface and the outer circumferential surface of the coil end groups 16a and 16b.

In that case, because the coil ends are fastened to each other, insulation characteristics are improved, the rigidity of the coil end groups 16a and 16b is increased, enabling the reduction of magnetic noise. If the electrically-insulative resin 25 is disposed so as to cover the inner circumferential surface of the coil end groups 16a and 16b, noise due to interference with the rotor 7 is reduced, reducing wind noise. And if the electrically-insulative resin 25 is disposed so as to cover the outer circumferential surface of the coil end groups 16a and 16b, suppressing infiltration inside the coil end groups 16a and 16b by foreign matter blown in from outside through the air discharge openings 1b and 2b.

In Embodiment 6 above, epoxy resin is used as the electrically-insulative resin 25, but a mixture containing a component with a higher thermal conductivity than the principal component of the resin itself may be used as the electrically-insulative resin. For example, the electrically-insulative resin 25 may be a mixture of epoxy resin (principal component) having a thermal conductivity of 0.5 (W/mk) and alumina having a thermal conductivity of 3.5 (W/mk) in a ratio of one to four (1:4). In that case, because heat generated in the stator winding 16 is quickly conducted through the electrically-insulative resin to the surface of the electrically-insulative resin and radiated from the surface of the electrically-insulative resin, cooling of the stator winding 16 is improved.

EMBODIMENT 7

Figure 15:
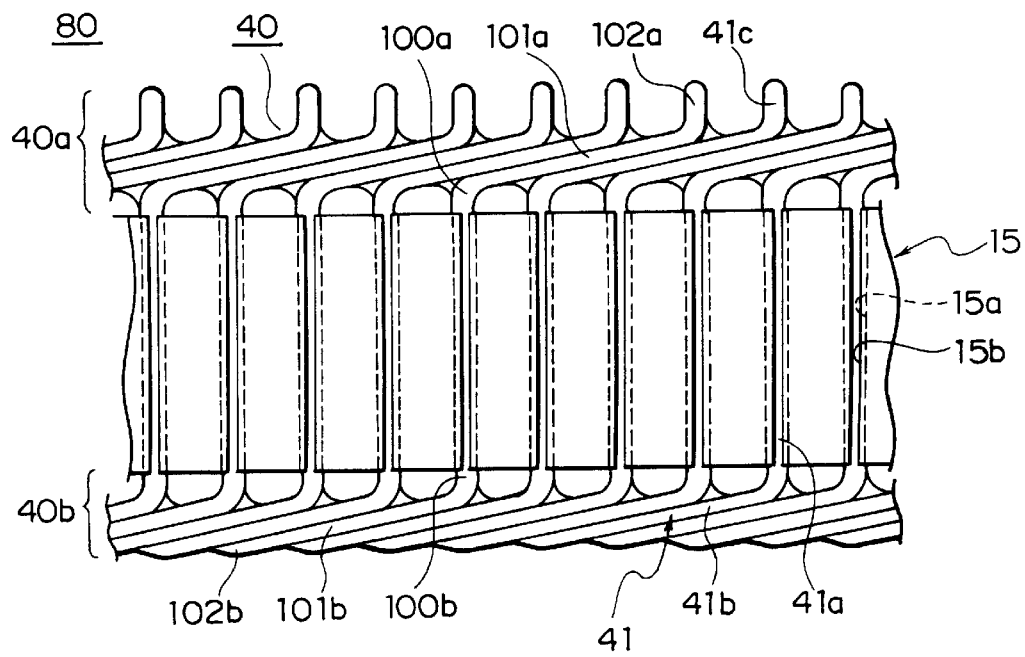
FIG. 15 is a partial front elevation of a stator for the automotive alternator according to Embodiment 7 of the present invention viewed from an inner circumferential side.

FIG. 15 is a partial front elevation of a stator for the automotive alternator according to Embodiment 7 of the present invention viewed from an inner circumferential side.

In FIG. 15, a stator 80 includes: a cylindrical stator core 15 formed with a number of slots 15a extending axially at a predetermined pitch in a circumferential direction; a stator winding 40 wound onto the stator core 15; and insulators (not shown) installed in each of the slots 15a for electrically insulating the stator winding 40 from the stator core 15. The stator winding 40 is constructed by connecting in series a number of coil segments 41 composed of short lengths of insulated electrical conductor of copper material or the like having a rectangular cross section. Each of the coil segments 41 is formed in a general U shape consisting of a pair of leg portions 41a joined by a turn portion 41b.

The stator winding 40 includes a number of winding sub-portions in which coil segments 41 are inserted into every sixth slot 15a so as to alternately occupy an inner layer and an outer layer in a slot depth direction, and free ends 41c extending outwards from the inner layer of first slots 15a and free ends 41c extending outwards from the outer layer of second slots 15a six slots away are joined to each other outside the slots. The coil ends outside the slots connecting inner layers in first slots 15a to outer layers in second slots 15a six slots away are formed into a connection pattern consisting of pairs of root portions 100a (100b) extending outwards from end surfaces of the stator core 15 from each of the slots 15a, pairs of inclined portions 101a (101b) bent in directions approaching each other so as to extend in a circumferential direction, and connecting portions 102a (102b) connecting end portions of pairs of inclined portions 101a (101b). At first and second axial ends of the stator core 15, coil ends formed into these connections patterns are repeated circumferentially to constitute coil end groups 40a and 40b. In addition, adjacent inclined portions 101a (101b) of the coil ends are in close proximity to each other.

Moreover, the rest of the construction is the same as in Embodiment 1 above.

Next, the winding method for one phase of stator winding group will be explained with reference to FIGS. 16A to 16D.

Figure 16A:
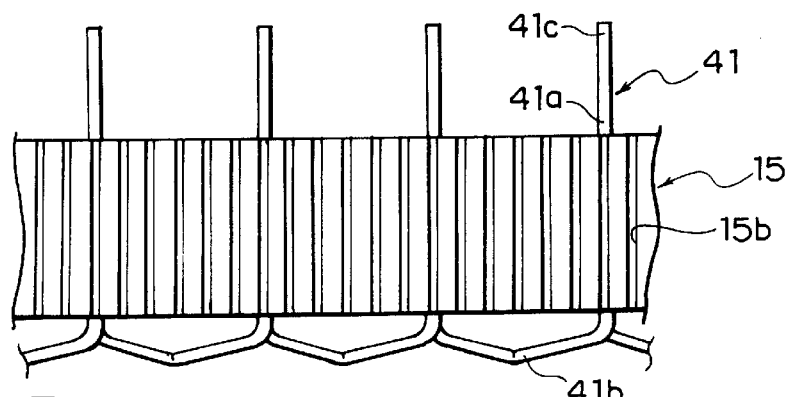
FIGS. 16A to 16D are diagrams explaining the method of winding the stator winding used in the automotive alternator according to Embodiment 7 of the present invention.

The coil segments 41 are inserted two at time from the rear end of the cylindrical stator core 15 into sets of slots 15a six slots apart, as shown in FIG. 16A. Each of the coil segments 41 on the inner circumferential side is inserted into the first position of a first slot 15a and the second position of a second slot 15a six slots away, and each of the coil segments 41 on the outer circumferential side is inserted into the third position of the first slot 15a and the fourth position of the second slot 15a six slots away. Thus, four leg portions 41a are housed in each slot 15a so as to line up in a row in a radial direction. The coil segments 41 are housed in sets of slots 15a six slots apart so as to be in different layers.

Figure 16B:
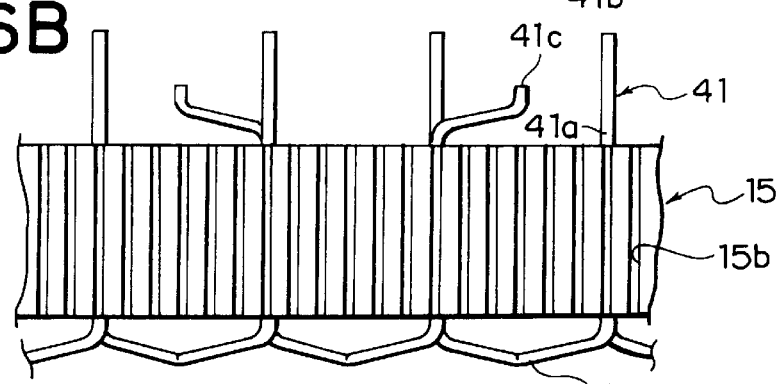

Next, each of the coil segments 41 is bent such that free ends 41c extending outwards from the front end open outwards in a circumferential direction. Here, FIG. 16B shows the free ends of one strand of coil segment 41 bent outwards in a circumferential direction.

Figure 16C:
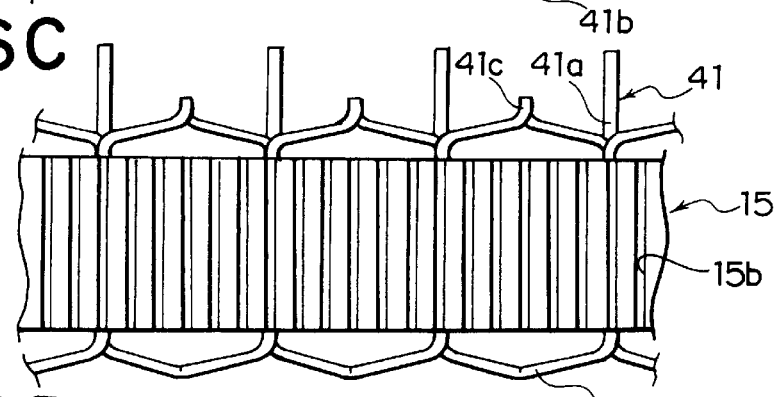

Then, free ends 41c of coil segments 41 extending outwards at the front end from the first positions of the slots 15a are stacked in a radial direction with the free ends 41c of coil segments 41 extending outwards at the front end from the second positions of slots 15a six slots away, and are joined by soldering or laser welding, as shown in FIG. 16C. Two inner circumferential coils consisting of inner circumferential coil segments 41 connected in series are thus obtained. Moreover, in order to distinguish the coil segments 41 on the inner circumferential side from those on the outer circumferential side, the free ends of the outer circumferential coil segments 41 are shown in an unbent state in FIG. 16C.

Figure 16D:
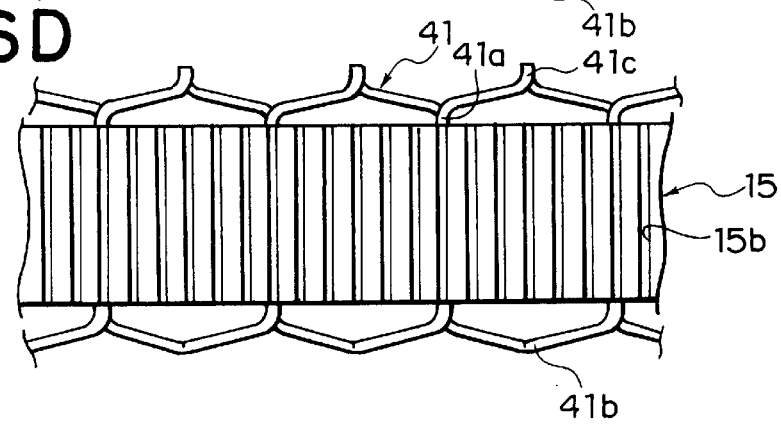

Similarly, free ends 41c of coil segments 41 extending outwards at the front end from the third positions of the slots 15a are stacked in a radial direction with the free ends 41c of coil segments 41 extending outwards at the front end from the fourth positions of slots 15a six slots away, and are joined by soldering or laser welding, as shown in FIG. 16D. Two outer circumferential coils consisting of outer circumferential coil segments 41 connected in series are thus obtained.

These inner and outer circumferential coils are connected based on the connections shown in FIG. 3 to form one phase of stator winding group having 4 turns.

Five more phases of stator winding groups are constructed by offsetting the groups of coil segments 41 by one slot each and connecting them similarly.

Three phases each of these stator winding groups are connected into alternating-current connections to form two sets of three-phase alternating-current windings constituting the stator winding 40.

In the stator 80 constructed in the above manner, coil ends constituted by the turn portions 41b of the coil segments 41 at the first end of the stator core 15 are repeated circumferentially to form coil end group 40b, and coil ends constituted by the joint portions between free ends 41c of the coil segments 41 at the second end of the stator core 15 are repeated circumferentially to form coil end group 40a. In both coil end groups 40a and 40b, the inclined portions 101a (101b) of adjacent coil ends are in close proximity with each other. Consequently, because the axial length of the coil end groups 40a and 40b is lower than the conventional coil end groups 52a and 52b and circumferential irregularities on the inner circumferential side of the coil end groups 40a and 40b can be significantly reduced, the same effects as in Embodiment 1 can also be achieved in Embodiment 7.

Furthermore, because the short coil segments 41 are used, the coil end shape can be formed uniformly, enabling a stator winding 40 having coil end groups 40a and 40b in which inclined portions 101a and 101b are in close proximity with each other to be manufactured easily.

All of the coil segments 41 are inserted into the slots 15a from the rear end of the stator core 15. Thus, because the rear-end coil end group 40b is constituted only by the turn portions 41b, each of the coil ends in the coil end group 40b have the same shape, providing superior alignment. Similarly, because the front-end coil end group 40a is constituted only by the joint portions between free ends 41c, each of the coil ends in the coil end group 40a have the same shape, providing superior alignment.

Moreover, in Embodiment 7, because coil segments 41 formed with a general U shape are used for the strands of wire, an operation is required for joining the free ends 41c to each other and the axial length of the coil end group 40a is made proportionately longer by the presence of the joint portions between the free ends 41c compared to Embodiment 1 in which strands of wire 30 composed of continuous wire is used, but Embodiment 7 is superior from the standpoint of alignment of the coil ends and installation of the coils in the slots 15a.

EMBODIMENT 8

Figure 17:
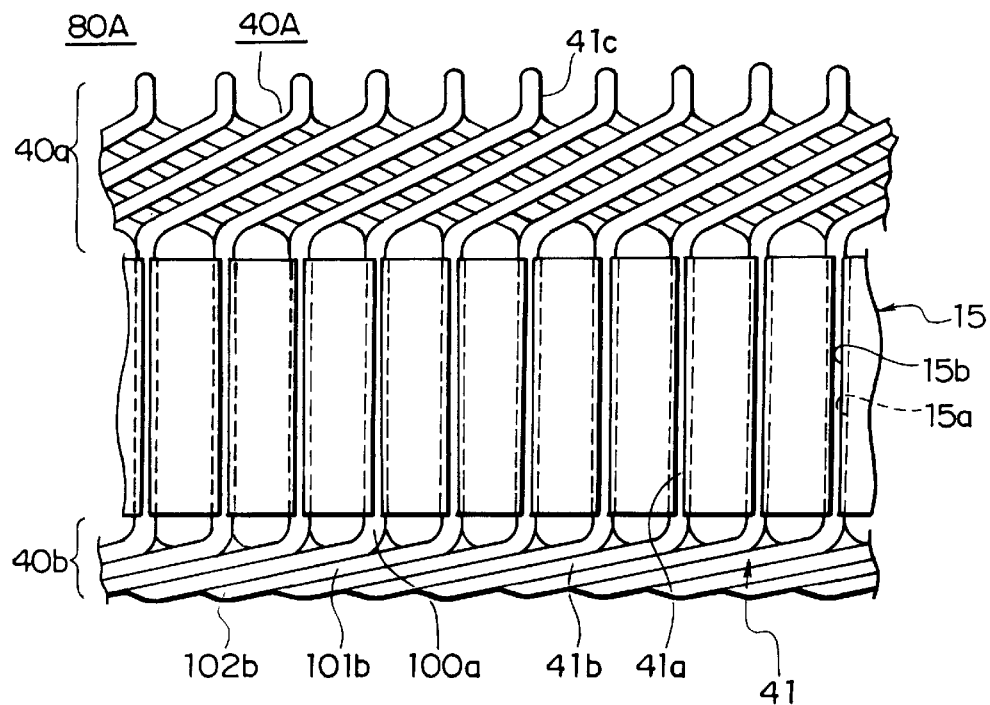
FIG. 17 is a partial front elevation of a stator for the automotive alternator according to Embodiment 8 of the present invention viewed from an inner circumferential side.

As shown in FIG. 17, in Embodiment 8, the coil ends constituted by the turn portions 41b of the coil segments 41 are repeated circumferentially to form coil end group 40b with the inclined portions 101b of adjacent coil ends in close proximity to each other, and the coil ends constituted by the joint portions between the free ends 41c of the coil segments 41 are spaced from each other and repeated circumferentially to form coil end group 40a.

Moreover, the rest of the construction is the same as in Embodiment 7 above.

In a stator 80A constructed in this manner, the axial length of the coil end group 40b constituted by the turn portions 41b of the coil segments 41 is shorter than the axial length of the conventional coil end group 52b and circumferential irregularities on the inner circumferential side can be significantly reduced.

Moreover, because the axial length of the coil end group 40b is shorter than the axial length of the coil end group 40a, it is desirable for the stator 80A to be mounted in the alternator with the coil end group 40b positioned at the rear end if consideration is to be given to the cooling of the rectifiers 12 and the regulator 18.

EMBODIMENT 9

Figure 18:
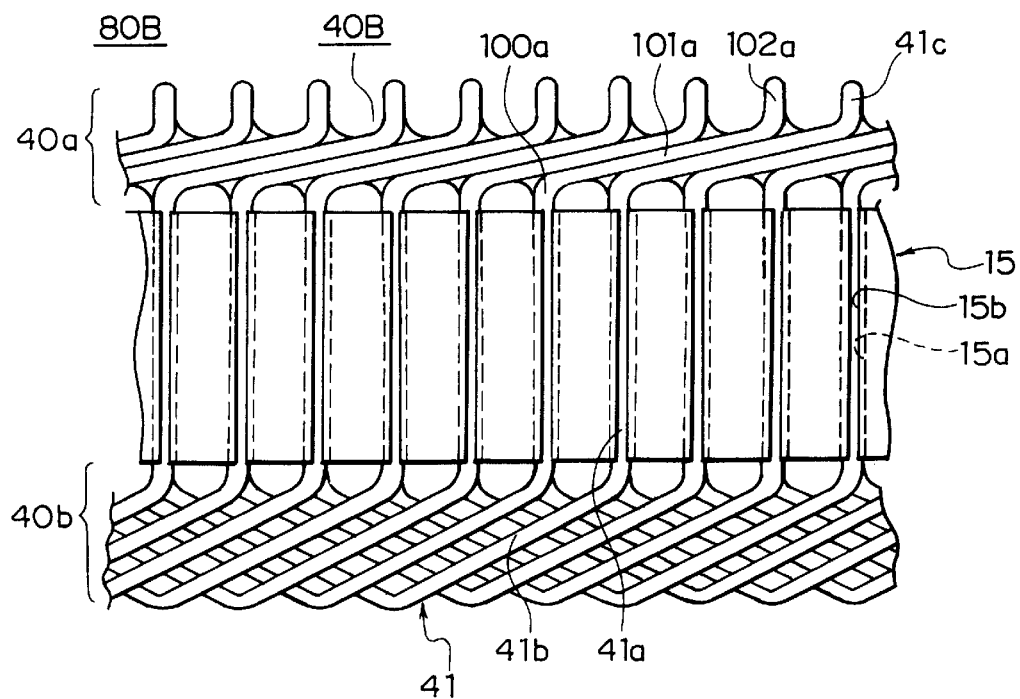
FIG. 18 is a partial front elevation of a stator for the automotive alternator according to Embodiment 9 of the present invention viewed from an inner circumferential side.
Figure 19:
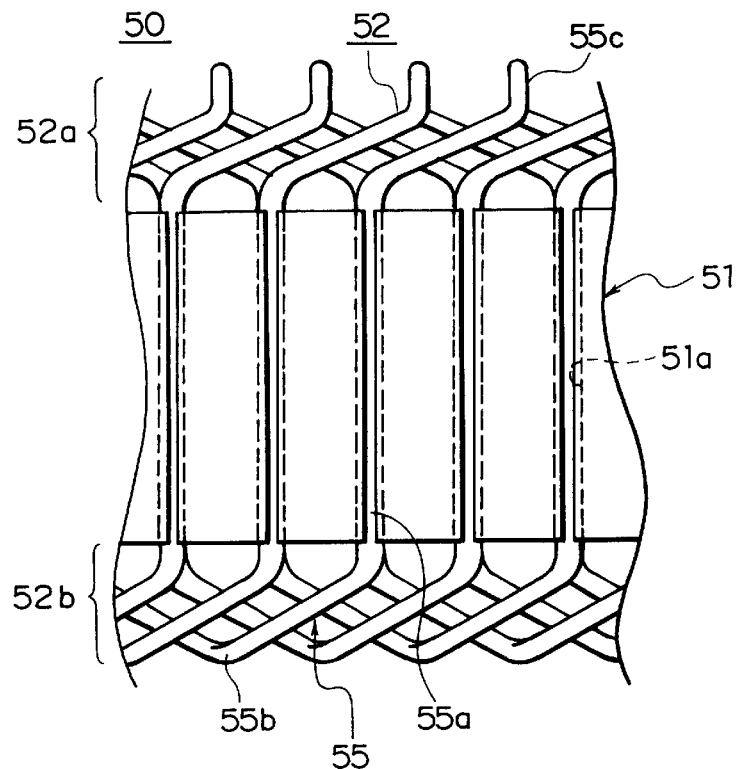
FIG. 19 is a partial front elevation of a conventional stator for an automotive alternator viewed from an inner circumferential side.
Figure 20:
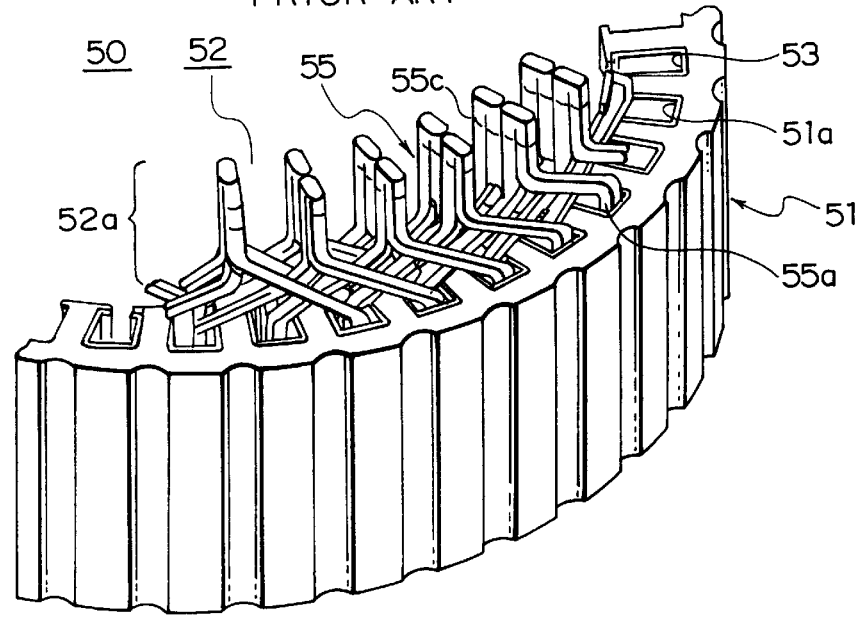
FIG. 20 is a perspective of part of the conventional stator mounted in an automotive alternator viewed from a front end.

As shown in FIG. 18, in Embodiment 9, the coil ends constituted by the joint portions between the free ends 41c of the coil segments 41 are repeated circumferentially to form coil end group 40a with the inclined portions 101b of adjacent coil ends in close proximity to each other, and the coil ends constituted by the turn portions 41b of the coil segments 41 are spaced from each other and repeated circumferentially to form coil end group 40b.

Moreover, the rest of the construction is the same as in Embodiment 7 above.

In a stator 80B constructed in this manner, the axial length of the coil end group 40a constituted by the joint portions between the free ends 41c of the coil segments 41 is shorter than the axial length of the conventional coil end group 52b and circumferential irregularities on the inner circumferential side can be significantly reduced.

Moreover, because the axial length of the coil end group 40a is shorter than the axial length of the coil end group 40b, it is desirable for the stator 80B to be mounted in the alternator with the coil end group 40a positioned at the rear end if consideration is to be given to the cooling of the rectifiers 12 and the regulator 18.

Moreover, in each of the above embodiments, the inclined portions 101a and 101b of the coil ends were arranged in rows in close proximity with each other, but in addition to the inclined portions 101a and 101b, the connecting portions 102a and 102b of the coil ends may also be arranged in rows in close proximity with each other.

Furthermore, the present invention is not limited to a stator winding having the winding constructions shown in the above embodiments, and may have any winding construction in which electrical conductors are housed in different layers in the slot depth direction in slots a predetermined number of slots apart, coil ends connect the electrical conductors outside the slots, and the coil ends are repeated so as to be arranged neatly in rows in the circumferential direction.

In each of the above embodiments, the fans 5 are disposed inside the case 3, but a fan may also be disposed outside the automotive alternator so as to rotate together with the rotation of the rotor.

Each of the above embodiments has been explained for stator winding groups 161 in which each phase has 4 turns, but the number of turns in the phases of the stator winding groups 161 should not be limited to four turns. When even lower-speed output is required, each phase of the stator winding groups may be made with six turns or eight turns.

Each of the above embodiments has been explained for use in an alternator with full-node windings, but the present constructions may also be used in an alternator with short-node windings (i.e., not full-node windings).

The present invention can also be applied to automotive alternators of the type in which the rotor coil is secured to a bracket and a rotating magnetic field is supplied across an air gap.

In each of the above embodiments, the number of slots in the stator was ninety-six slots for sixteen magnetic poles, but three phases and seventy-two slots for twelve magnetic poles, three phases and 120 slots for twenty poles, etc., may also be adopted. Furthermore, in the case of one slot per pole per phase, there may also be forty-eight slots for sixteen poles, thirty-six slots for twelve poles, sixty slots for twenty poles, etc. Moreover, because a larger number of slots per pole per phase makes the slot pitch becomes narrower, it becomes easier to place the inclined portions 101a and 101b of the coil ends in close proximity and the axial length of the coil end groups can be reduced, and if the present invention is applied to a stator having two or more slots per pole per phase, the effects of the present invention become prominent.

Each of the above embodiments used a Lundell-type rotor having claw-shaped magnetic poles, but the same effects can be achieved using a Salent-type rotor having projecting magnetic poles.

In each of the above embodiments, the rectifiers are disposed at the end of the rotor away from the pulley and the fan is disposed at the same end, but the fan may also be disposed at the end near the rectifiers. When there is no particular problem with the temperature of the rectifiers, the fan may also be disposed at the end away from the pulley. Because the height of the coil ends of the stator is low, wind resistance on the discharge side in the wind channel of the fan is significantly reduced, increasing the overall amount of cooling air. Consequently, suitable relative positions for the rectifiers and the fans or for the pulley and the fans may also be selected in consideration of the position where the alternator is mounted on the engine, of wind noise, of magnetic noise, and of the temperature conditions of each portion.

In Embodiment 1 above, the insulators are inserted on the laminated core side before the insertion of the winding assemblies into the laminated core, but the insulators may also first be wrapped around the portions of the winding assemblies to be housed in the slots and inserted into the laminated core together with the winding assemblies. Furthermore, a long strip of insulators may be placed on top of the parallelepiped laminated core and the winding assemblies inserted form above such that the insulators are simultaneously inserted into and housed inside the slots together with the wire-strand groups. In that case, at a later stage, the protruding insulators may be removed together in one step. In addition, the portions of the winding assemblies to be housed in the slots may be pre-molded with insulating resin. In that case, mass-producibility is significantly improved.

The present invention is constructed in the above manner and exhibits the effects described below.

According to the present invention, there is provided an alternator including:

a rotor for forming north-seeking (N) and south-seeking (S) poles along a rotational circumference;

a stator having a cylindrical stator core formed with a number of slots extending axially at a predetermined pitch in a circumferential direction and disposed around an outer circumference of the rotor facing the rotor and a stator winding wound onto the stator core;

a bracket supporting the rotor and the stator;

a rectifier disposed at one end of the rotor; and a cooling means operating together with rotation of the rotor for forming a passage of cooling air within the bracket for cooling the rotor and the rectifier, the stator winding comprising:

a number of stator winding sub-portions each of which is constituted by insulated strands of wire wound onto the stator core so as to be housed in different layers relative to a slot depth direction within slots a predetermined number of slots apart, the different layers within the slots the predetermined number of slots apart being joined in series outside the slots to constitute coil ends, wherein each of the coil ends is formed into a connection pattern comprising a pair of root portions extending outwards from the slots the predetermined number of slots apart, a pair of inclined portions bent over and extending circumferentially from the root portions and a connecting portion connecting ends of the pair of inclined portions to each other, wherein coil end groups of the stator winding are constructed by arranging the coil ends formed into the connection pattern neatly into rows circumferentially at both axial ends of the stator core, and wherein the coil ends in at least one of the coil end groups are arranged in rows circumferentially such that the inclined portions of adjacent coil ends are in close proximity to each other without gaps. Thus, because axial length of the coil end groups is reduced and circumferential irregularities arising on the inner circumferential side of the coil end groups are also reduced, an alternator is provided which enables the realization of improved reliability, high performance, and low cost.

Because at least one of the coil end groups of the stator winding may be disposed in a vicinity of the cooling means on a downstream side of the cooling means in the passage, cooling of the coil end groups is improved, suppressing temperature increases in the stator winding.

Because the bracket may be provided with a number of openings radially outside at least one of the coil end groups, cooling ventilation in which the temperature has risen due to the cooling of the coil end groups is quickly expelled to the exterior. Thus, poor cooling of the stator winding as a result of heated cooling ventilation remaining inside the bracket is ameliorated.

Because the cooling means may be a fan disposed on at least one end portion of the rotor, the fan being rotated together with the rotor, cooling ventilation is supplied to the coil end groups from radially inside, increasing the cooling effect and enabling the cooling means to be constructed inexpensively.

Because distances between inner circumferential surfaces of the coil end groups and an outer diameter of the fan may be substantially uniform in a circumferential direction, noise due to interference between the blades and inner circumferential surfaces of the coil end groups is made uniform in the circumferential direction, reducing wind noise.

Because the axial length of the stator may be shorter than the axial length of the rotor, wind resistance is reduced, improving cooling and enabling the size of the alternator to be reduced.

Because the axial lengths of the coil end groups may be equal at first and second axial ends of the stator core, wind resistance becomes generally the same at both axial ends of the stator core, enabling the stator to be uniformly cooled.

Because the axial length of the coil end groups at the first axial end of the stator core may be shorter than an axial length of the coil end groups at the second axial end of the stator core, wind resistance is reduced at the first end of the stator, enabling temperature increases in the rectifiers to be suppressed.

Because the rotor may be a claw pole type, the rotor functions as a wind conveying means, improving cooling.

Because the number of slots may be two or more per pole per phase, the axial length of the coil end groups can be further reduced.

Because electrically-insulative resin may be disposed so as to cover at least one side of at least one of the coil end groups, the side being selected from an inner circumferential side and an outer circumferential side, gaps between the inclined portions of the coil ends are filled, suppressing the infiltration of foreign matter into the coil end groups, increasing the rigidity of the stator, and reducing electromagnetic noise.

Because the cross-sectional shape of the strands of wire may be a generally flat shape, the distance between the coil ends can be further compacted.

Because the strands of wire may be coil segments composed of short lengths of insulated electrical conductor, it becomes easier to form the coil end shape uniformly, and easier to place the inclined portions in close proximity.

Because the coil segments may be insulated electrical conductors formed into a general U shape, and each of the winding sub-portions may be constructed by inserting the coil segments so as to form different layers relative to the slot depth direction within the slots the predetermined number of slots apart, bending free ends of the coil segments extending outwards from the slots the predetermined number of slots apart towards each other in a circumferential direction for connection, and joining the free ends, the inclined portions of the coil ends can easily be formed in close proximity with each other, facilitating the manufacture of the stator.

Because the coil segments may be inserted into the slots from one axial end of the stator core such that U-shaped turn portions are arranged in rows, the coil ends constituting each of the coil end groups have the same general shape, increasing the alignment of the coil ends.

Because the strands of wire may be continuous wires composed of insulated electrical conductors, the coil ends are constituted by continuous wire turn portions, reducing the axial length of the coil end groups.

Because the winding sub-portions may comprise first winding sub-portions and second winding sub-portions, each of the first winding sub-portions having one turn and being constructed by winding one strand of insulated wire so as to fold back outside the slots at end surfaces of the stator core and alternately occupy an inner layer and an outer layer in the slot depth direction within the slots at intervals of the predetermined number of slots, and each of the second winding sub-portions having one turn and being constructed by winding one strand of insulated wire so as to fold back outside the slots at end surfaces of the stator core and alternately occupy an inner layer and an outer layer in the slot depth direction within the slots at intervals of the predetermined number of slots and so as to be inverted and offset from the first winding sub-portions by an electrical angle of 180°; and the stator winding may be constructed by at least one set of winding assembly constructed by a pair of a first winding group and a second winding group, the first winding group being constructed by arranging the first winding sub-portions, whose number are the same as the predetermined number of slots, at a slot pitch of one, and the second winding group being constructed by arranging the second winding sub-portions, whose number are the same as the predetermined number of slots, at a slot pitch of one. Thus, the coil ends can be arranged in rows at high density, enabling coil end groups in which the inclined portions of the coil ends are arranged in close proximity to each other without gaps to be prepared easily, thus enabling stator windings having an increased number of turns in each phase of the winding to be easily adapted to by increasing the number of sets of winding assemblies.

What is claimed is:

1. An alternator comprising:
   a rotor for forming north-seeking (N) and south-seeking (S) poles along a rotational circumference;
   a stator having a cylindrical stator core formed with a number of slots extending axially at a predetermined pitch in a circumferential direction and disposed around an outer circumference of said rotor facing said rotor and a stator winding wound onto said stator core;
   a bracket supporting said rotor and said stator;
   a rectifier disposed at one end of said rotor; and
   a cooling means operating together with rotation of said rotor for forming a passage of cooling air within said bracket for cooling said rotor and said rectifier, said stator winding comprising:
   a number of stator winding sub-portions each of which is constituted by insulated strands of wire wound onto said stator core so as to be housed in different layers relative to a slot depth direction within slots a predetermined number of slots apart, said different layers within said slots said predetermined number of slots apart being joined in series outside said slots to constitute coil ends,
   wherein each of said coil ends is formed into a connection pattern comprising a pair of root portions extending outwards from said slots said predetermined number of slots apart, a pair of inclined portions bent over and extending circumferentially from said root portions and a connecting portion connecting ends of said pair of inclined portions to each other,
   wherein coil end groups of said stator winding are constructed by arranging said coil ends formed into said connection pattern neatly into rows circumferentially at both axial ends of said stator core, and
   wherein said coil ends in at least one of said coil end groups are arranged in rows circumferentially such that said inclined portions of adjacent coil ends are in close proximity to each other without gaps.

2. The alternator according to claim 1, wherein at least one of said coil end groups of said stator winding is disposed in a vicinity of said cooling means on a downstream side of said cooling means in said passage.

3. The alternator according to claim 1, wherein said bracket is provided with a number of openings radially outside at least one of said coil end groups.

4. The alternator according to claim 1, wherein said cooling means is a fan disposed on at least one end portion of said rotor, said fan being rotated together with said rotor.

5. The alternator according to claim 4, wherein distances between inner circumferential surfaces of said coil end groups and an outer diameter of said fan are substantially uniform in a circumferential direction.

6. The alternator according to claim 1, wherein an axial length of said stator is shorter than an axial length of said rotor.

7. The alternator according to claim 1, wherein axial lengths of said coil end groups are equal at first and second axial ends of said stator core.

8. The alternator according to claim 1, wherein an axial length of said coil end groups at said first axial end of said stator core is shorter than an axial length of said coil end groups at said second axial end of said stator core.

9. The alternator according to claim 1, wherein said rotor is a claw pole type.

10. The alternator according to claim 1, wherein the number of said slots is two or more per pole per phase.

11. The alternator according to claim 1, further comprising electrically-insulative resin disposed so as to cover at least one side of at least one of said coil end groups, said side being selected from an inner circumferential side and an outer circumferential side.

12. The alternator according to claim 1, wherein a cross-sectional shape of said strands of wire is a generally flat shape.

13. The alternator according to claim 1, wherein said strands of wire are coil segments composed of short lengths of insulated electrical conductor.

14. The alternator according to claim 13, wherein said coil segments are insulated electrical conductors formed into a general U shape, and each of said winding sub-portions is constructed by inserting said coil segments so as to form different layers relative to said slot depth direction within said slots said predetermined number of slots apart, bending free ends of said coil segments extending outwards from said slots said predetermined number of slots apart towards each other in a circumferential direction for connection, and joining said free ends.

15. The alternator according to claim 14, wherein said coil segments are inserted into said slots from one axial end of said stator core such that U-shaped turn portions are arranged in rows.

16. The alternator according to claim 1, wherein said strands of wire are continuous wires composed of insulated electrical conductors.

17. The alternator according to claim 1, wherein said winding sub-portions comprises first winding sub-portions and second winding sub-portions, each of said first winding sub-portions having one turn and being constructed by winding one strand of insulated wire so as to fold back outside said slots at end surfaces of said stator core and alternately occupy an inner layer and an outer layer in said slot depth direction within said slots at intervals of said predetermined number of slots, and each of said second winding sub-portions having one turn and being constructed by winding one strand of insulated wire so as to fold back outside said slots at end surfaces of said stator core and alternately occupy an inner layer and an outer layer in said slot depth direction within said slots at intervals of said predetermined number of slots and so as to be inverted and offset from said first winding sub-portions by an electrical angle of 180°; and wherein said stator winding is constructed by at least one set of winding assembly constructed by a pair of a first winding group and a second winding group, said first winding group being constructed by arranging said first winding sub-portions, whose number are the same as said predetermined number of slots, at a slot pitch of one, and said second winding group being constructed by arranging said second winding sub-portions, whose number are the same as said predetermined number of slots, at a slot pitch of one.

* * * * *